United States Patent
Campbell et al.

(10) Patent No.: US 11,726,174 B1
(45) Date of Patent: Aug. 15, 2023

(54) METHODS AND SYSTEMS FOR REMOVING TRANSMIT PHASE NOISE

(71) Applicant: Waymo LLC, Mountain View, CA (US)

(72) Inventors: Timothy Campbell, Mountain View, CA (US); Edwin Lim, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 220 days.

(21) Appl. No.: 17/134,793

(22) Filed: Dec. 28, 2020

Related U.S. Application Data

(60) Provisional application No. 62/955,190, filed on Dec. 30, 2019.

(51) Int. Cl.
  *G01S 7/40* (2006.01)
  *G01S 13/931* (2020.01)
  *G01S 7/35* (2006.01)

(52) U.S. Cl.
  CPC ............ *G01S 7/4008* (2013.01); *G01S 7/354* (2013.01); *G01S 7/40* (2013.01); *G01S 13/931* (2013.01)

(58) Field of Classification Search
  CPC .......... G01S 7/4008; G01S 7/354; G01S 7/40; G01S 13/931
  USPC .......................................................... 342/70
  See application file for complete search history.

(56) References Cited

U.S. PATENT DOCUMENTS

| | | | | |
|---|---|---|---|---|
| 4,298,873 A | * | 11/1981 | Roberts | H01Q 3/2617 342/375 |
| 5,107,273 A | * | 4/1992 | Roberts | G01S 7/2813 342/417 |
| 5,325,095 A | * | 6/1994 | Vadnais | G01S 13/32 342/194 |
| 5,986,600 A | * | 11/1999 | McEwan | G01S 13/56 342/28 |
| 6,104,346 A | * | 8/2000 | Rudish | G01S 3/04 342/442 |
| 6,522,290 B2 | * | 2/2003 | Mattox | G01S 17/34 342/194 |

(Continued)

FOREIGN PATENT DOCUMENTS

| | | | | |
|---|---|---|---|---|
| EP | 2513666 B1 | * | 2/2015 | ............. G01S 13/04 |
| EP | 2798369 B1 | * | 6/2018 | ......... G01S 13/0209 |

*Primary Examiner* — Nuzhat Pervin
(74) *Attorney, Agent, or Firm* — McDonnell Boehnen Hulbert & Berghoff LLP

(57) ABSTRACT

Example embodiments described herein involve techniques for removing transmit phase noise. A system may cause a printed circuit board (PCB) to supply a signal enabling the transmission line to couple the signal to the radar unit and the delay line to couple the signal to the quadrature coupler. The radar unit may use the signal to transmit a radar signal on a radio channel having a centered radio frequency while the quadrature coupler uses the signal to produce an output from the quadrature coupler. The system may estimate phase noise relative to the radio channel having the centered RF based on the output from the quadrature coupler, receive, from the radar unit, a radar reflection corresponding to the radar signal, and determine information representative of one or more objects in an environment based on the radar reflection and the phase noise.

12 Claims, 13 Drawing Sheets

(56) References Cited

U.S. PATENT DOCUMENTS

| | | | | |
|---|---|---|---|---|
| 6,822,606 B2* | 11/2004 | Ponsford | | G01S 7/2921 |
| | | | | 342/159 |
| 7,548,181 B1* | 6/2009 | Bausov | | G01V 3/12 |
| | | | | 342/159 |
| 8,125,350 B2* | 2/2012 | Wilbrod | | G01S 13/91 |
| | | | | 340/933 |
| 9,223,015 B2 | 12/2015 | Kojima | | G01S 7/023 |
| 9,989,627 B2 | 6/2018 | Eshraghi | | G01S 13/931 |
| 10,067,221 B2* | 9/2018 | Ginsburg | | G01S 13/931 |
| 10,164,756 B2 | 12/2018 | Baker | | H04L 25/025 |
| 10,627,503 B2 | 4/2020 | Vacanti | | F41H 11/00 |
| 10,663,559 B2 | 5/2020 | Huemer | | H03B 1/04 |
| 2005/0059364 A1 | 3/2005 | Hansen | | H04B 1/1027 |
| | | | | 455/73 |
| 2006/0199587 A1* | 9/2006 | Hansen | | H04B 15/02 |
| | | | | 455/442 |
| 2007/0086713 A1* | 4/2007 | Ingmar | | H01S 3/067 |
| | | | | 385/122 |
| 2007/0259636 A1* | 11/2007 | Fisher | | G01S 3/043 |
| | | | | 455/207 |
| 2012/0212360 A1* | 8/2012 | Kanter | | H03M 1/1245 |
| | | | | 341/137 |
| 2012/0262333 A1* | 10/2012 | Trummer | | H05H 7/22 |
| | | | | 342/146 |
| 2015/0198709 A1* | 7/2015 | Inoue | | G01S 13/346 |
| | | | | 342/147 |
| 2015/0241555 A1* | 8/2015 | Lin | | A61B 5/0205 |
| | | | | 702/56 |
| 2015/0260835 A1* | 9/2015 | Widmer | | B60L 53/126 |
| | | | | 342/27 |
| 2015/0301167 A1* | 10/2015 | Sentelle | | H01Q 9/27 |
| | | | | 342/22 |
| 2016/0291130 A1* | 10/2016 | Ginsburg | | G01S 7/352 |
| 2018/0074168 A1* | 3/2018 | Subburaj | | G01S 7/038 |
| 2018/0196124 A1* | 7/2018 | Vacanti | | G01S 7/292 |
| 2019/0235050 A1* | 8/2019 | Maligeorgos | | G01S 7/032 |
| 2019/0339359 A1* | 11/2019 | Wang | | G01S 13/343 |
| 2019/0353752 A1* | 11/2019 | Lin | | A61B 5/05 |
| 2020/0025871 A1* | 1/2020 | Subburaj | | G01S 7/292 |
| 2021/0021914 A1* | 1/2021 | Perlmutter | | H04Q 11/0005 |
| 2021/0149018 A1* | 5/2021 | Elad | | G01S 7/35 |
| 2021/0356557 A1* | 11/2021 | Sam | | G01S 7/03 |

* cited by examiner

METHODS AND SYSTEMS FOR REMOVING TRANSMIT PHASE NOISE

CROSS REFERENCE TO RELATED APPLICATION

The present patent application claims priority to U.S. Provisional Application No. 62/955,190, filed on Dec. 30, 2019, which is hereby incorporated by reference in entirety.

BACKGROUND

Radio detection and ranging systems ("radar systems") can be used to estimate distances to environmental features by emitting radio signals and detecting returning reflected signals. Distances to radio-reflective features can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped.

SUMMARY

The present disclosure generally relates techniques for determining and reducing transmit phase noise that can arise during radar operations. Particularly, techniques may involve using circuitry that can enable phase noise to be determined and removed when processing radar reflections that originate from stretch Linear Frequency Modulated (LFM) pulse waveform signals.

In one aspect, the present application describes a system. The system includes a radar unit, a printed circuit board (PCB) having a transmission line coupled to the radar unit and a delay line coupled to a quadrature coupler, and a processing unit. The processing unit is configured to cause the PCB to supply a signal. The transmission line is configured to couple the signal to the radar unit and the delay line is configured to couple the signal to the quadrature coupler. The processing unit is also configured to cause the radar unit to transmit a radar signal on a radio channel having a centered radio frequency (RF) using the signal and estimate phase noise relative to the radio channel having the centered RF based on an output from the quadrature coupler. The processing unit is further configured to receive, from the radar unit, a radar reflection corresponding to the radar signal and determine information representative of one or more objects based on the radar reflection and the phase noise.

In another aspect, the present application describes a method. The method involves causing, by a computing device, a printed circuit board (PCB) to supply a signal. The PCB includes a transmission line coupled to a radar unit and a delay line coupled to a quadrature coupler. The transmission line is configured to couple the signal to the radar unit and the delay line is configured to couple the signal to the quadrature coupler. The method further involves causing, by the computing device, the radar unit to transmit a radar signal on a radio channel having a centered radio frequency (RF) using the signal and estimating phase noise relative to the radio channel having the centered RF based on an output from the quadrature coupler. The method also involves receiving, at the computing device and from the radar unit, a radar reflection corresponding to the radar signal and determining, by the computing device, information representative of one or more objects based on the radar reflection and the phase noise.

In yet another example, the present application describes a non-transitory computer-readable medium configured to store instructions, that when executed by a computing system comprising one or more processors, causes the computing system to perform operations. The operations may involve one or more operations of the method above.

A fourth embodiment may involve a system that includes various means for carrying out each of the operations of the first, second, and third embodiments.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
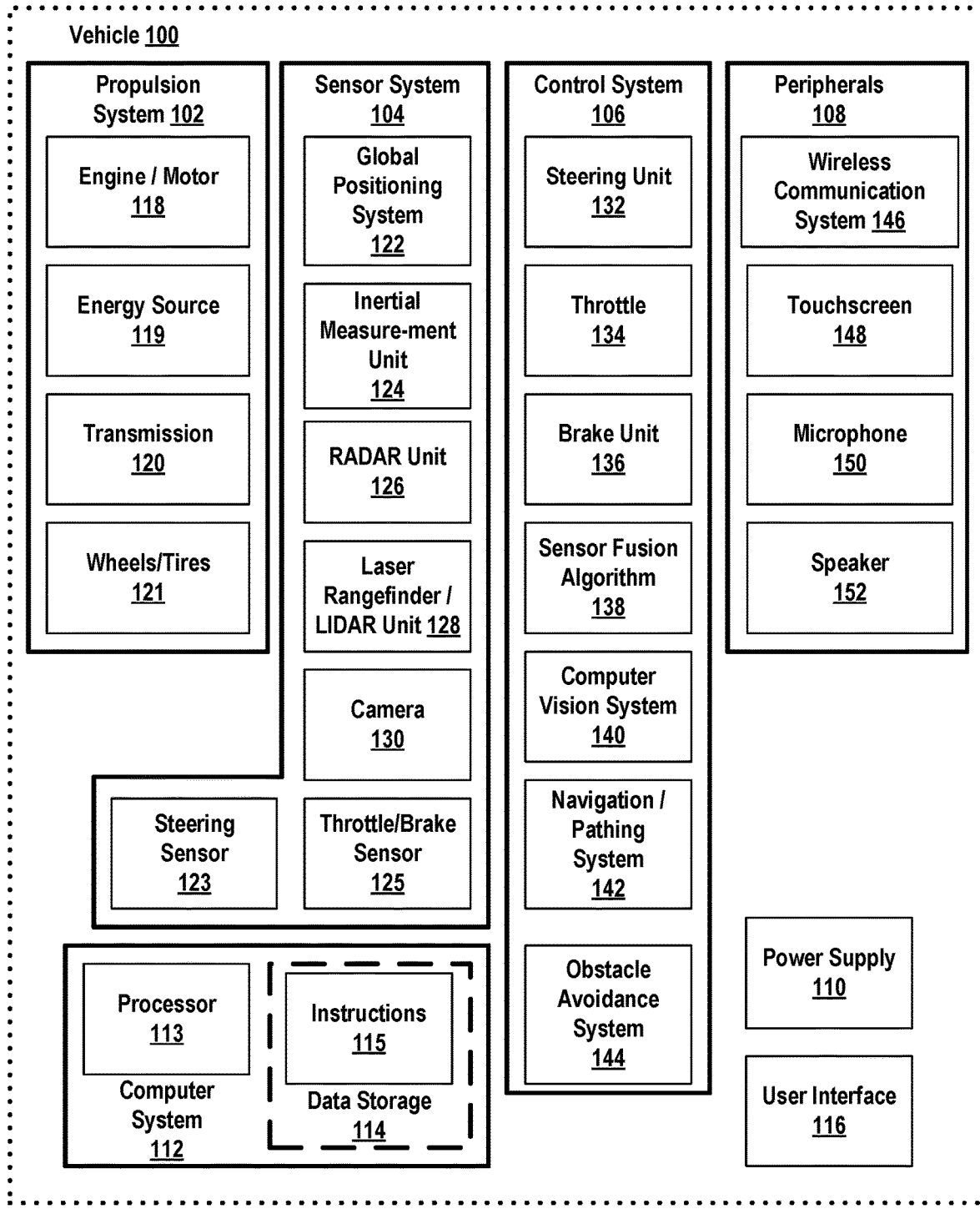
FIG. 1 is a functional block diagram illustrating a vehicle, according to one or more example embodiments.
Figure 2A:
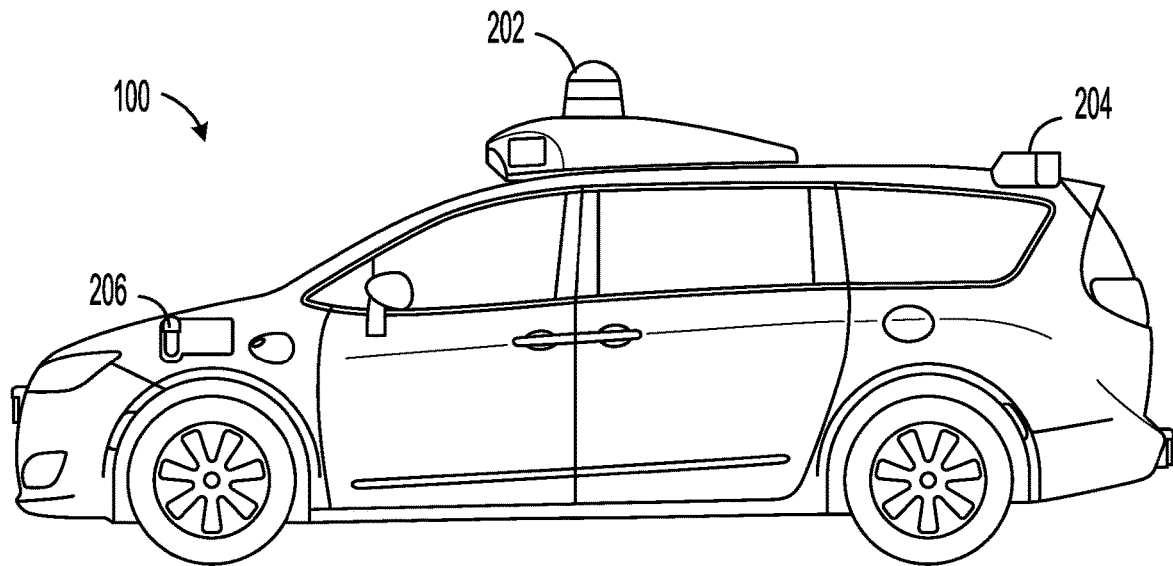
FIG. 2A illustrates a side view of a vehicle, according to one or more example embodiments.
Figure 2B:
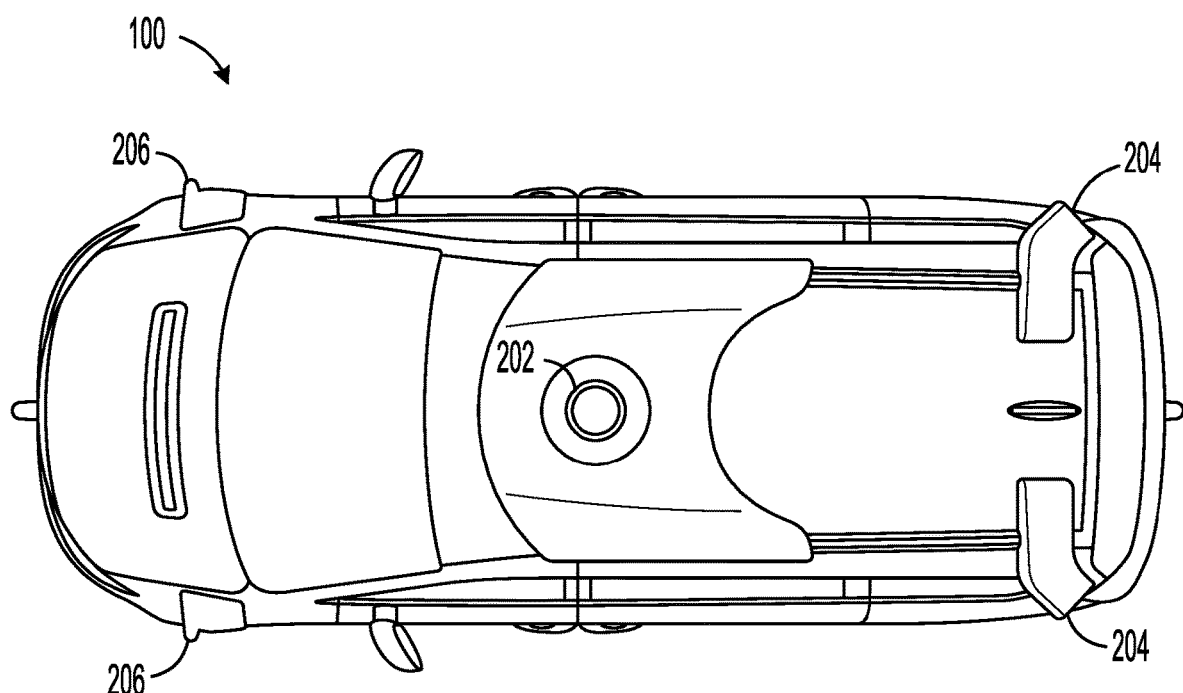
FIG. 2B illustrates a top view of a vehicle, according to one or more example embodiments.
Figure 2C:
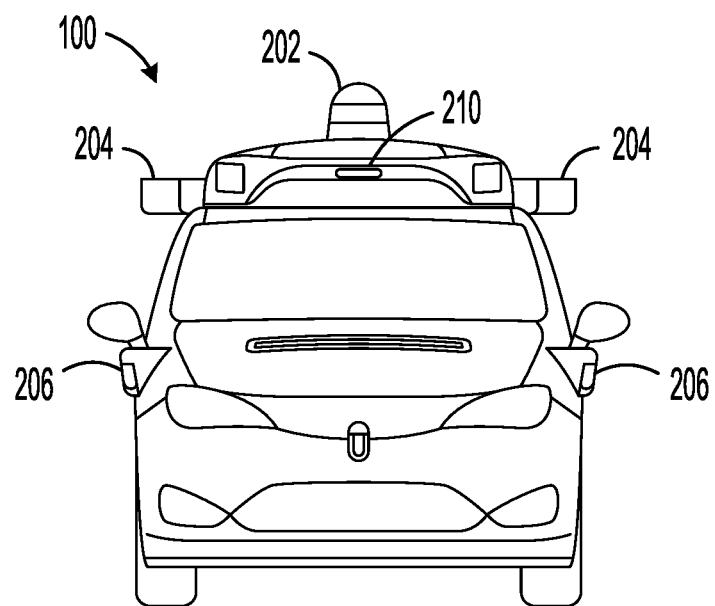
FIG. 2C illustrates a front view of a vehicle, according to one or more example embodiments.
Figure 2D:
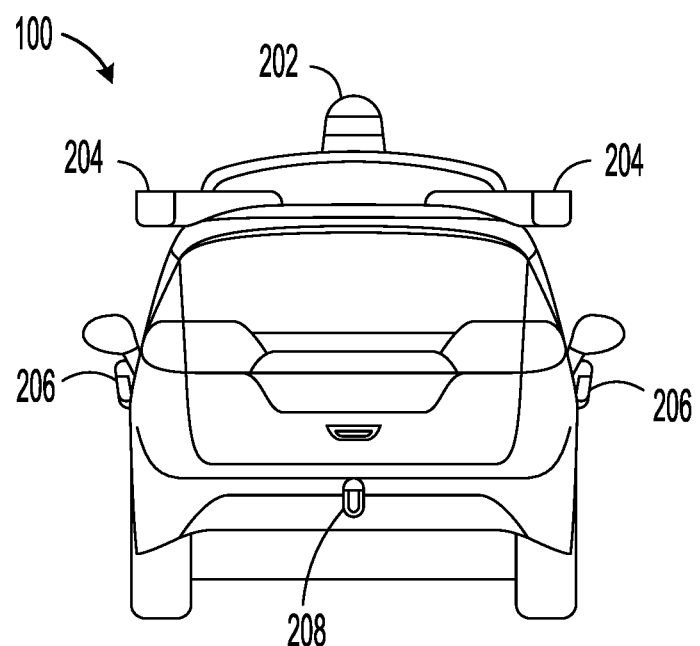
FIG. 2D illustrates a back view of a vehicle, according to one or more example embodiments.
Figure 2E:
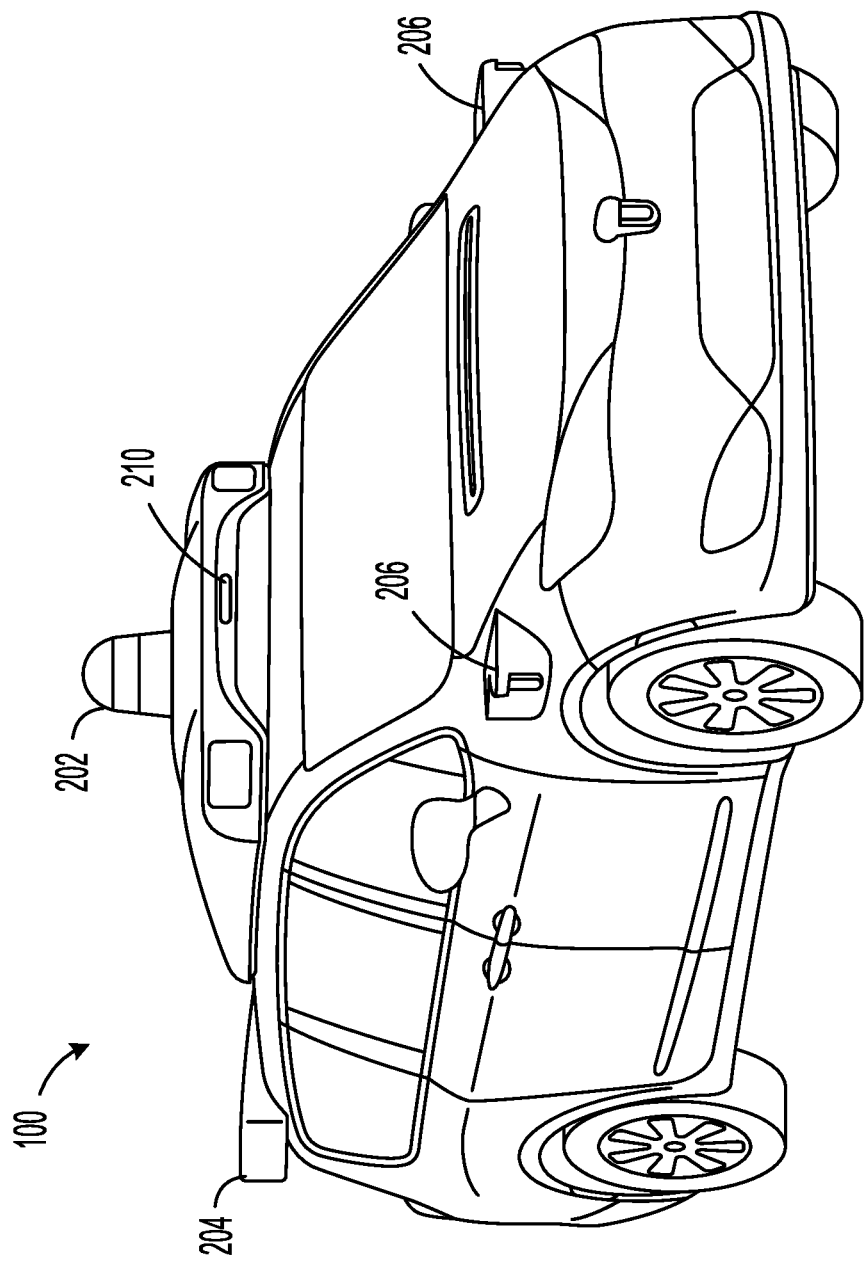
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system uses one or more antennas to emit (i.e. transmit) radar signals to measure aspects of an environment. Upon coming into contact with surfaces in the environment, emitted radar signals can scatter in multiple directions with some penetrating into various surfaces while others reflect off surfaces and back towards one or more reception antennas of the radar system. Once received by one or more reception antennas, radar reflections can be processed to generate two dimensional (2D) and/or three dimensional (3D) measurements of the environment. In particular, these measurements may convey the positions, orientations, and movements of nearby surfaces occupying the environment near the radar system.

Because radar systems can measure distances and motions of nearby objects and other surfaces, they are increasingly being used to assist with vehicle navigation and safety. Particularly, measurements from a vehicle radar system can enhance overall performance and safety during vehicle navigation. The vehicle radar system can detect and identify the positions, orientations, and movements of nearby vehicles. Radar measurements can also reveal information about other features in the vehicle's surrounding environment, such as road boundaries and road conditions (e.g., smooth or bumpy surfaces), weather conditions (e.g., wet or snowy roadways), traffic signs and signals, and pedestrians. In some instances, radar measurements are used to assist a driver controlling the vehicle. For instance, radar measurements may be used to generate alerts when the vehicle is too close to another vehicle or object. Radar measurements can also be used to develop control strategies for autonomous or semi-autonomous navigation of the vehicle.

During operation of a radar unit, transmit phase noise may be introduced by non-ideal phase history in the transmitted waveform. Transmit phase noise can impact quality of data in range Doppler maps and other measurements derived via radar. The spatially correlated nature of transmit phase noise can raise the noise floor nearby large scatterers, potentially masking weaker reflectors from detection.

As such, radar transmit phase noise can degrade impulse response for received signals measuring the environment. In some instances, the extended bandwidth of transmit phase noise can cause large returns to mask the presence of smaller returns, which may desensitize the sensor to the environment. In addition, transmitting radar signals may include phase noise that can degrade receiver matched processing.

Example embodiments presented herein relate to methods and systems for removing transmit phase noise that can arise during signal processing by a radar system. An example phase noise removal technique may involve utilizing software that integrates phase noise removal into a filter (e.g., a range deskew filter) to mitigate phase noise from a stretch LFM radar to increase clarity within radar measurements of the environment. Some phase noise mitigation techniques described herein may involve a system that implements 2 hadamard products and uses a range deskew filter. As such, some example techniques may enable processing radar reflections using a filter that is configured to remove phase noise during processing.

By way of an example, a system configured to remove phase noise during radar operation can include a combination of hardware and software that enables the removal of the phase noise from received radar signals. For instance, the hardware may involve a passive RF circuit (i.e., a phase noise estimation circuit) composed of a delay line (e.g., a waveguide or microstrip) and a quadrature coupler that generates 2 outputs from the input signal received via the delay line. In particular, the outputs produced by the quadrature coupler are 90 degrees out of phase. These outputs collectively form an IQ output, which can be fed into a stretch digital signal processor. The stretch digital signal processor may independently mix the "I" and the "Q" signals down to basebands prior to an analog-to-digital sampling. For instance, the stretch processor system may mix an LFM modulation with a copy of the transmitted waveform when processing radar reflections. This differs from conventional radar, which typically uses an RF carrier to mix the whole modulation down to a reasonably low frequency where it can be sampled. As such, a stretch processor system can be configured to perform a portion of signal processing in hardware (using the phase noise estimation circuit) to reduce the digital bandwidth of the system.

The phase noise estimation circuit can sample the RF signal used for radar signal transmission to produce an output that can be used by a digital signal processor (e.g., a stretch processor) to estimate the phase error present in the radiated waveforms traversing from the radar unit. The phase error estimation may be designed to compensate for the dispersive nature of the delay line and may be used to cancel waveform phase noise present in the received phase history. Particularly, the digital signal processing of radar reflections as the radar system operates may involve factoring the phase noise derived from the phase noise measurement circuit.

In some examples, a computing device may cause a printed circuit board (PCB) to supply a signal such that the signals traverse to both the radar unit and the hardware circuit designed to produce an output that can be used to subsequently filter noise when processing received signals. Particularly, the signal (or a portion of the signal) may be delivered on a transmission line to the radar unit for transmission into the environment. In some cases, the radar unit may transmit the radar signals as stretch LFM pulse waveforms. In addition, the signal (or a portion of the signal) may be coupled to a quadrature coupler via the delay line. The radar unit may transmit radar signals on a radio channel having a centered RF based on the signals from the PCB. By receiving the signal via the delay line, the quadrature coupler may produce an output that can be used to derive potential phase noise associated with signal transmission. As such, the computing device may determine information representative of objects in the environment based on radar reflections and the phase noise. For example, the computing device processing incoming radar reflections may generate a mixed signal that combines a radar reflection and the output (e.g., IQ output) from the quadrature coupler and subsequently modify the mixed signal based on the phase noise. The modification may involve removing the phase noise from the mixed signals using a digital filter, such as a range deskew filter. As such, the information determined about the environment may be derived from the mixed signal without the phase noise.

The delay line used to couple signals from the PCB to the quadrature coupler may further include other components to help prepare the signal for phase noise determination. For example, the hardware circuit may include one or more intermediate frequency (IF) filters, gain stages, homodyne mixers, and/or analog-to-digital converters. The arrangement of the components within the hardware circuit can vary within embodiments.

In some examples, a vehicle radar system may implement techniques described herein. For instance, a stretch processing system positioned on a vehicle may be configured to use a transmit phase removal technique to increase accuracy measurements obtained via radar by reducing noise within reflections. As such, the control system of the vehicle may use the information representative of the environment to navigate the vehicle safely.

The following detailed description may be used with an apparatus (e.g., radar unit) having one or multiple antenna arrays. The one or multiple antenna arrays may take the form of a single-input single-output single-input, multiple-output (SIMO), multiple-input single-output (MISO), multiple-input multiple-output (MIMO), and/or synthetic aperture radar (SAR) radar antenna architecture.

In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays. In addition, one or more transmission lines of a radar unit can be implemented on a printed circuit board (PCB) in some examples.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm, 4 mm). A radar system may use one or more antennas that can focus radiated energy into tight beams to measure an environment with high accuracy. Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

Some example radar architecture may include multiple metal layers (e.g., aluminum plates) machined with computer numerical control (CNC), aligned and joined together. For example, a metal layer may include a first half of an input waveguide channel, where the first half of the first waveguide channel includes an input port that may be configured to receive electromagnetic waves (e.g., W-band waves) into the first waveguide channel. The metal layer may also include a first half of a plurality of wave-dividing channels. The plurality of wave-dividing channels may comprise a network of channels that branch out from the input waveguide channel and that may be configured to receive electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The waveguide antenna elements and/or the waveguide output ports may be rectangular in shape, in some embodiments. In alternative embodiments, the waveguide antenna elements and/or the waveguide output ports may be circular in shape. Other shapes are also possible.

Based on the shape and the materials of the corresponding polarization-modification channels and waveguides, the distribution of propagating energy can vary at different locations within a radar unit, for example. The shape and the materials of the polarization-modification channels and waveguides can define the boundary conditions for the electromagnetic energy. Boundary conditions are known conditions for the electromagnetic energy at the edges of the polarization-modification channels and waveguides. For example, in a metallic waveguide, assuming the polarization-modification channel and waveguide walls are nearly perfectly conducting (i.e., the waveguide walls can be approximated as perfect electric conductors—PECs), the boundary conditions specify that there is no tangentially (i.e., in the plane of the waveguide wall) directed electric field at any of the wall sides. Once the boundary conditions are known, Maxwell's Equations can be used to determine how electromagnetic energy propagates through the polarization-modification channels and waveguides.

Maxwell's Equations may define several modes of operation for any given polarization-modification channel or waveguide. Each mode has one specific way in which electromagnetic energy can propagate through the polarization-modification channel or waveguide. In addition, each mode has an associated cutoff frequency. A mode is not supported in a polarization-modification channel or waveguide if the electromagnetic energy has a frequency that is below the cutoff frequency. By properly selecting both (i) dimensions and (ii) frequency of operation, electromagnetic energy may propagate through the polarization-modification channels and waveguides in specific modes. The polarization-modification channels and/or the waveguides can be designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the respective polarization-modification channel or waveguide (e.g., assuming a rectangular waveguide). However, a suffix number of zero indicates that there is no variation of the field with respect to that direction. For example, a $TE_{10}$ mode indicates the polarization-modification channel or waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e., two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

Additionally or alternatively, different radar units using different polarizations may prevent interference during operation of the radar system. For example, the radar system may be configured to interrogate (i.e., transmit and/or receive radar signals) in a direction normal to the direction of travel of an autonomous vehicle via SAR functionality. Thus, the radar system may be able to determine information about roadside objects that the vehicle passes. In some examples, this information may be two dimensional (e.g., distances various objects are from the roadside). In other examples, this information may be three dimensional (e.g., a point cloud of various portions of detected objects). Thus, the vehicle may be able to "map" the side of the road as it drives along, for example.

Some examples may involve using radar units having antenna arrays arranged in MIMO architecture. Particularly, the filter may be determined to adjust near-field measurements by a radar unit having antenna arrays arranged in MIMO architecture. Radar signals emitted by the transmission antennas are orthogonal to each other and can be received by one or multiple corresponding reception antennas. As such, the radar system or associated signal processor can perform 2D SAR image formation along with a 3D matched filter to estimate heights for pixels in a 2D SAR map formed based on the processed radar signals.

If two autonomous vehicles are using analogous radar systems to interrogate the environment (e.g., using the SAR technique described above), it could also be useful for those autonomous vehicles to use different polarizations (e.g., orthogonal polarizations) to do the interrogation, thereby preventing interference. Additionally, a single vehicle may operate two radar units having orthogonal polarizations so that each radar unit does not interfere with the other radar unit.

Further, the configuration of a radar system can differ within examples. For instance, some radar systems may consist of radar units that are each configured with one or more antennas arrays. An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Radar units configured with antenna arrays can differ in overall configuration. For instance, the number of arrays, position of arrays, orientation of arrays, and size of antenna arrays on a radar unit can vary in examples. In addition, the quantity, position, alignment, and orientation of radiating elements (antennas) within an array of a radar unit can also vary. As a result, the configuration of a radar unit may often depend on the desired performance for the radar unit. For example, the configuration of a radar unit designed to measure distances far from the radar unit (e.g., a far range of the radar unit) may differ compared to the configuration of a radar unit used to measure an area nearby the radar unit (e.g., a near field of the radar unit).

To further illustrate, in some examples, a radar unit may include the same number of transmission antenna arrays and reception antenna arrays (e.g., four arrays of transmission antennas and four arrays of reception antennas). In other examples, a radar unit may include a number of transmission antenna arrays that differs from the number of reception antenna arrays (e.g., 6 transmission antenna arrays and 3 reception antenna arrays). In addition, some radar units may operate with parasitic arrays that can control radar transmissions. Other example radar units may include one or multiple driven arrays that have radiating elements connected to an energy source, which can have less overall energy loss when compared to parasitic arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array.

A radar unit may also include multiple types of arrays (e.g., a linear array on one portion and a planar array on another portion). As such, radar units configured with one or more antenna arrays can reduce the overall number of radar units a radar system may require to measure a surrounding environment. For example, a vehicle radar system may include radar units with antenna arrays that can be used to measure particular regions in an environment as desired while the vehicle navigates.

Some radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

Referring now to the figures, FIG. 1 is a functional block diagram illustrating example vehicle 100. Vehicle 100 may represent a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communications, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted atop the roof of vehicle 100. Additionally, other mounting locations are possible within examples.

Figure 3:
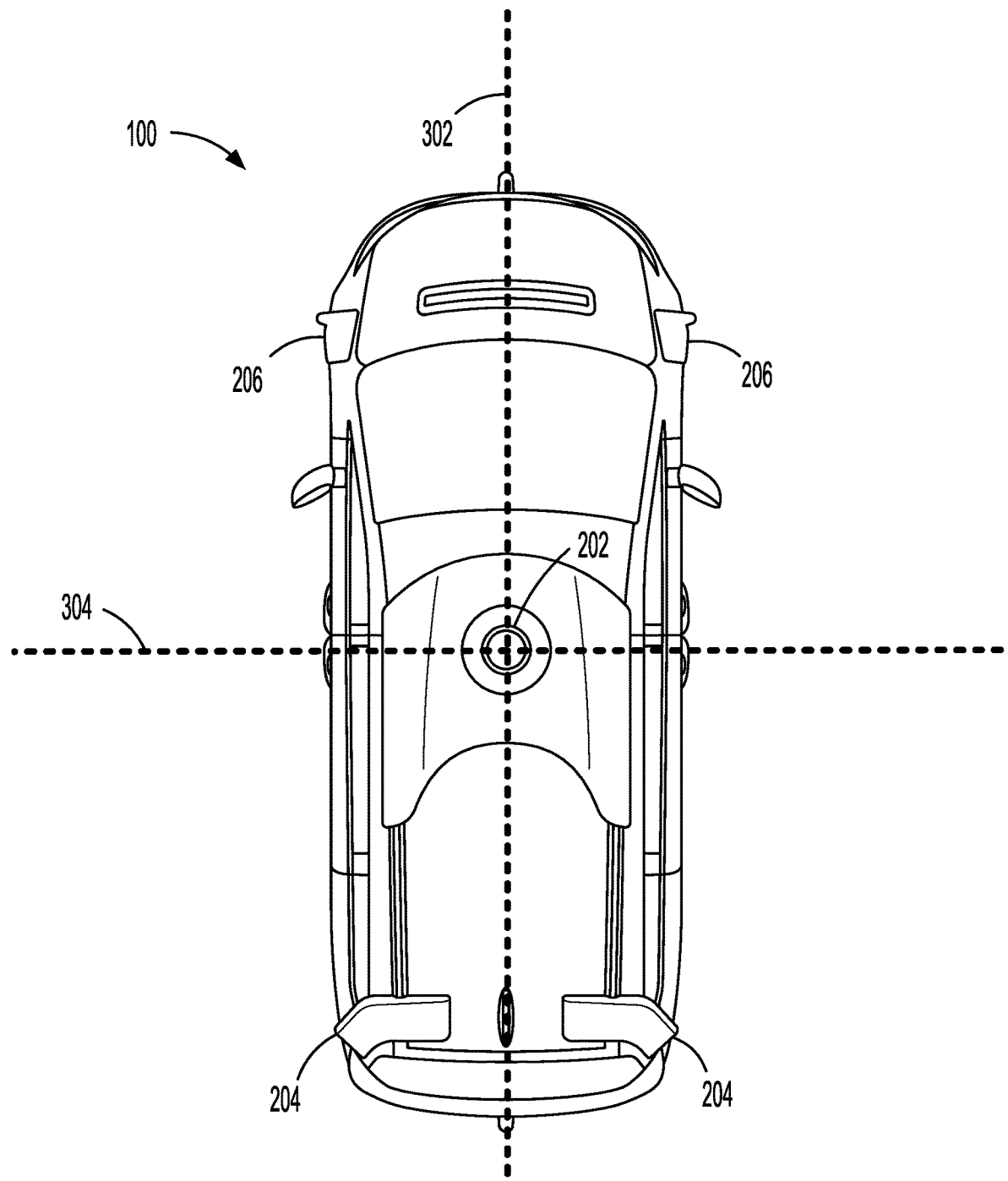
FIG. 3 illustrates a layout of radar sectors, according to one or more example embodiments.

FIG. 3 illustrates a layout of radar sectors, according to one or more embodiments. As shown, each radar sector may have an angular width approximately equal to the scanning range of the radar units. For example, the sectors may divide the azimuth plane around vehicle 100 into multiple sectors (e.g., 90 degree sectors, 120 degree sectors). In various different examples, scanning may be performed on the transmit side, the receive side, or both. For example, scanning on the transmit side may include iteratively transmitting a radar signal in predetermined directions and receiving radar signals across the full sector. In another example, scanning on the receive side may include transmitting a radar signal across the full sector and receiving radar signals across the full sector and performing digital beamforming on the received signals. In other examples, different forms of scanning may be used as well.

The example radar sectors may align with axes 302, 304 relative to vehicle 100. In some instances, each radar unit may be configured to scan across one sector. Further, because each example radar unit of FIG. 3 has a scanning angle of approximately 90 degrees, each radar unit scans a region that may not overlap with the scanning angle of other radar units. In other examples, the sectors may overlap.

In order to achieve radar sectors defined by the midpoints of vehicle 100, each radar unit may be mounted at a 45-degree angle with respect to the two axes of vehicle 100. By mounting each radar unit at a 45 degree angle with respect to the two axes of vehicle 100, a 90 degree scan of the radar unit would scan from one vehicle axis to the other vehicle axis. For example, radar units mounted at a 45-degree angle to the axes at sensor positions 206 may be able to scan the front left and front right sectors (from vertical axis 302 through the front of vehicle 100 to horizontal axis 304 that runs through the sides of the vehicle, respectively). In order to scan the back right and back left sectors, radar units may be mounted at sensor positions 204. The radar unit placements shown in FIG. 3 are merely to illustrate one possible example.

In various other examples, radar units may be placed in other locations, such as on top or along (or within) other portions of the vehicle, and/or coupled to the underbody of vehicle 100. Further, the sectors may also be defined differently in other embodiments. For example, the sectors may be at a 45-degree angle with respect to the vehicle. In this example, one radar unit may face forward, a different one facing backward, and the other two to the sides of the vehicle.

In some examples, all the radar units of vehicle 100 may be configured with the same scanning angle. The azimuth plane around the vehicle is equal to a full 360 degrees. Thus, if each radar unit is configured with the same scanning angle, then the scanning angle for the radar units would be equal to approximately 360 divided by the number of radar units on the vehicle. Thus, for full azimuth plane scanning, vehicle 100 with one radar unit would need that radar unit to be able to scan over the full 360 degrees.

If vehicle 100 had two radar units, each would scan approximately 180 degrees. For three radar units, each would be configured to scan 120 degrees. For four radar units, as shown in FIG. 3, each may scan approximately 90 degrees. Five radar units may be configured on vehicle 100 and each may be able to scan 72 degrees. Further, six radar units may be configured on vehicle 100 and each may be able to scan approximately 60 degrees. Other examples are possible In further examples, the number of radar units may be chosen based on a number of criteria, such as ease of manufacture of the radar units, vehicle placement, or other criteria. For example, some radar units may be configured with a planar structure that is sufficiently small. The planar radar unit may be mountable at various positions on a vehicle. For example, a vehicle may have a dedicated radar housing mounted on the top of the vehicle. The radar housing may contain various radar units. In other embodiments, radar units may be placed within the vehicle structure.

In some embodiments, it may be desirable to place radar units in positions where the object covering the radar unit (i.e., radome) is at least partially transparent to radar. For example, various plastics, polymers, and other materials may form part of the vehicle structure and cover the radar units, while allowing the radar signal to pass through.

Additionally, in some embodiments, the radar units may be configured with different scanning ranges for different radar units. In some embodiments, a specific radar unit with a wide scanning angle may not be able to be placed on the vehicle in the proper location. Thus, a smaller radar unit, with a smaller scanning angle may be placed in that location.

However, other radar units may be able to have larger scanning angles. Therefore, the total scanning angle of the radar units may add up to 360 degrees (or more) and provide full 360 degree azimuthal scanning. For example, a vehicle may have 3 radar units that each scans over 100 degrees and a fourth radar unit that scans over 60 degrees. Thus, the radar units may be able to scan the full azimuth plane, but the scanning sectors may not be equal in angular size.

Figure 4A:
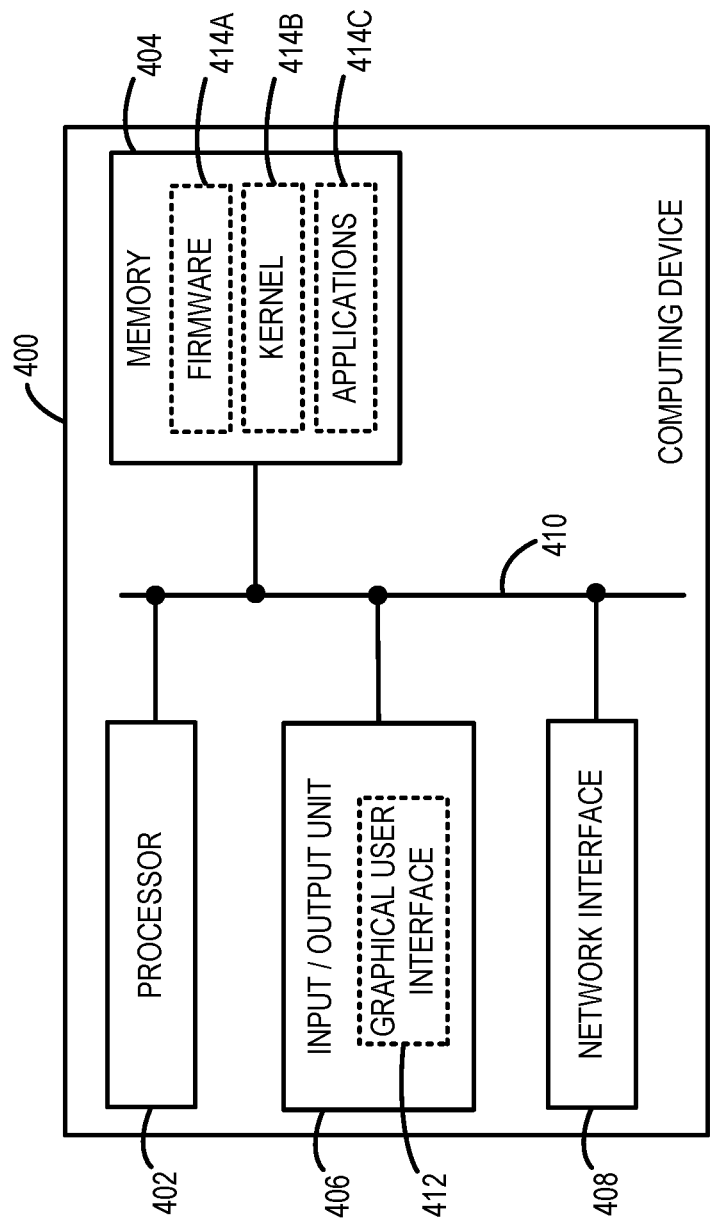
FIG. 4A is a block diagram of a computing device, according to one or more example embodiments.

FIG. 4A is a simplified block diagram exemplifying computing device 400, illustrating some of the components that could be included in a computing device arranged to operate in accordance with the embodiments herein. Computing device 400 could be a client device (e.g., a device actively operated by a user (e.g., a remote operator)), a server device (e.g., a device that provides computational services to client devices), or some other type of computational platform. In some embodiments, computing device 400 may be implemented as computer system 112, which can be located on vehicle 100 and perform processing operations related to vehicle operations. For example, computing device 400 can be used to process sensor data received from sensor system 104, develop control instructions, enable wireless communication with other devices, and/or perform other operations. Alternatively, computing device 400 can be located remotely from vehicle 100 and communicate via secure wireless communication. For example, computing device 400 may operate as a remotely positioned device that a remote human operator can use to communicate with one or more vehicles.

In the example embodiment shown in FIG. 4, computing device 400 includes processor 402, memory 404, input/output unit 406 and network interface 408, all of which may be coupled by a system bus 410 or a similar mechanism. In some embodiments, computing device 400 may include other components and/or peripheral devices (e.g., detachable storage, sensors, and so on).

Processor 402 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 402 may be one or more single-core processors. In other cases, processor 402 may be one or more multi-core processors with multiple independent processing units. Processor 402 may also include register memory for temporarily storing instructions being executed and related data, as well as cache memory for temporarily storing recently-used instructions and data.

Memory 404 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing device 400 may include fixed memory as well as one or more removable memory units, the latter including but not limited to various types of secure digital (SD) cards. Thus, memory 404 can represent both main memory units, as well as long-term storage. Other types of memory may include biological memory.

Memory 404 may store program instructions and/or data on which program instructions may operate. By way of example, memory 404 may store these program instructions on a non-transitory, computer-readable medium, such that the instructions are executable by processor 402 to carry out any of the methods, processes, or operations disclosed in this specification or the accompanying drawings.

As shown in FIG. 4, memory 404 may include firmware 414A, kernel 414B, and/or applications 414C. Firmware 414A may be program code used to boot or otherwise initiate some or all of computing device 400. Kernel 414B may be an operating system, including modules for memory management, scheduling and management of processes, input/output, and communication. Kernel 414B may also include device drivers that allow the operating system to communicate with the hardware modules (e.g., memory units, networking interfaces, ports, and busses), of computing device 400. Applications 414C may be one or more user-space software programs, such as web browsers or email clients, as well as any software libraries used by these programs. In some examples, applications 414C may include one or more neural network applications and other deep learning-based applications. Memory 404 may also store data used by these and other programs and applications.

Input/output unit 406 may facilitate user and peripheral device interaction with computing device 400 and/or other computing systems. Input/output unit 406 may include one or more types of input devices, such as a keyboard, a mouse, one or more touch screens, sensors, biometric sensors, and so on. Similarly, input/output unit 406 may include one or more types of output devices, such as a screen, monitor, printer, speakers, and/or one or more light emitting diodes (LEDs). Additionally or alternatively, computing device 400 may communicate with other devices using a universal serial bus (USB) or high-definition multimedia interface (HDMI) port interface, for example. In some examples, input/output unit 406 can be configured to receive data from other devices. For instance, input/output unit 406 may receive sensor data from vehicle sensors.

As shown in FIG. 4, input/output unit 406 includes GUI 412, which can be configured to provide information to a remote operator or another user. GUI 412 may be displayable one or more display interfaces, or another type of mechanism for conveying information and receiving inputs. In some examples, the representation of GUI 412 may differ depending on a vehicle situation. For example, computing device 400 may provide GUI 412 in a particular format, such as a format with a single selectable option for a remote operator to select from.

Network interface 408 may take the form of one or more wireline interfaces, such as Ethernet (e.g., Fast Ethernet, Gigabit Ethernet, and so on). Network interface 408 may also support communication over one or more non-Ethernet media, such as coaxial cables or power lines, or over wide-area media, such as Synchronous Optical Networking (SONET) or digital subscriber line (DSL) technologies. Network interface 408 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 408. Furthermore, network interface 408 may comprise multiple physical interfaces. For instance, some embodiments of computing device 400 may include Ethernet, BLUETOOTH®, and Wifi interfaces. In some embodiments, network interface 408 may enable computing device 400 to connect with one or more vehicles to allow for remote assistance techniques presented herein.

In some embodiments, one or more instances of computing device 400 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 400 may enable the performance of embodiments described herein, including processing of sensor data.

Figure 4B:
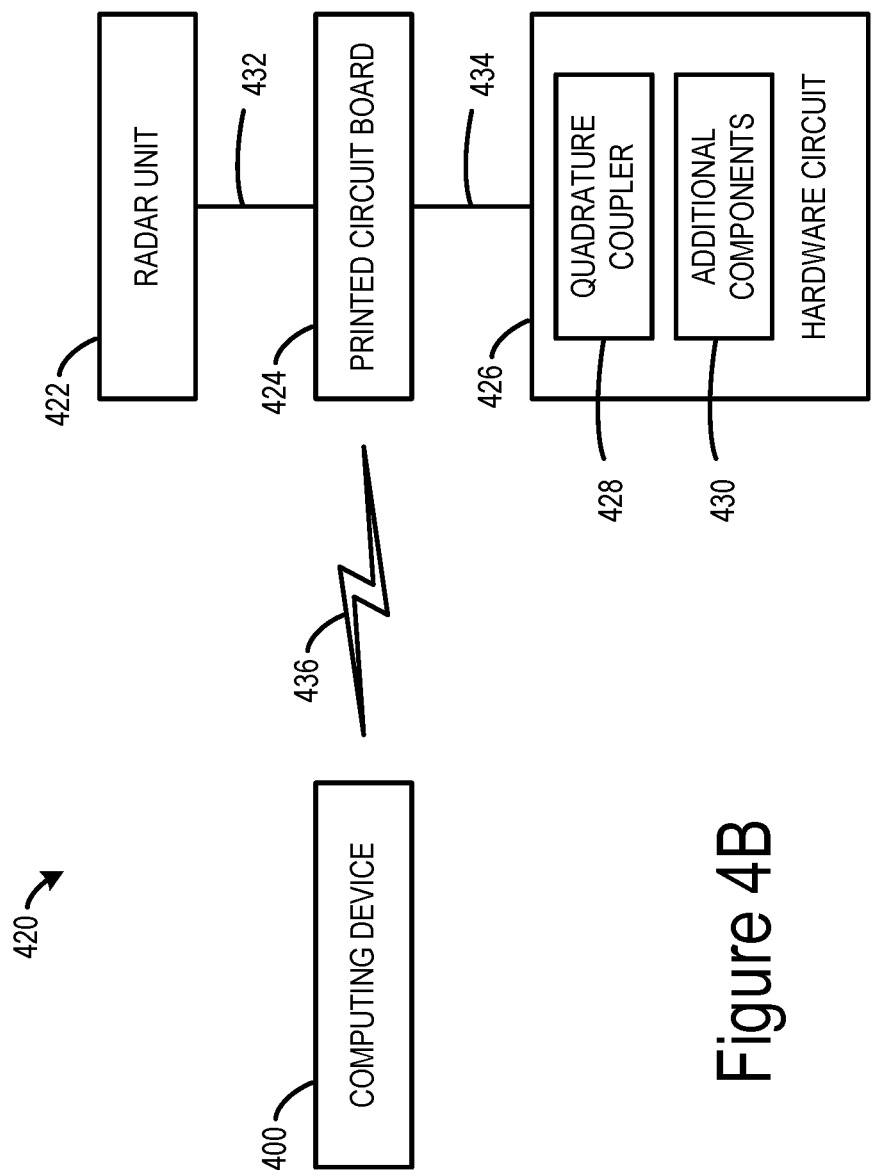
FIG. 4B is a system for removing transmit phase noise, according to one or more example embodiments.

FIG. 4B illustrates a system for removing transmit phase noise, according to one or more example embodiments. In the example embodiment, system 420 includes computing device 400, radar unit 422, printed circuit board (PCB) 424, and hardware circuit 426. PCB 424 is shown electrically coupled to radar unit 422 via transmission line 432 and electrically coupled to hardware circuit 426 via delay line 434. In other embodiments, system 420 can include more or less components in other arrangements.

System 420 may utilize computing device 400 to perform one or more operations, such as operations related to transmit noise removal. As such, computing device 400 may operate as a processing unit in some embodiments and is shown in communication 436 with PCB 424. Communication 436 can be wired or wireless in examples. In other examples, system 420 may have multiple processing units. System 420 may be implemented onboard a vehicle as a part of one or more vehicle systems.

Computing device 400 may cause PCB 424 to supply signals to other components within system 420. For instance, PCB 424 may use a power source or other means to generate the signal, which can be supplied to both radar unit 422 via transmission line 432 and hardware circuit 426 via delay line 434. Radar unit 422 represents any type of radar unit capable of transmitting and/or receiving signals to measure the nearby environment. Particularly, radar unit 422 may receive and use the signals to transmit one or more radar signals into the environment. The radar signals may be transmitted on a radio channel having a centered RF based on the incoming signal originating from PCB 424.

Hardware circuit 426 can receive signals from PCB 424 via delay line 434. As shown, hardware circuit 426 includes quadrature coupler 428 and additional components 430. Quadrature coupler 428 may take an input signal and split the input signal into two signals. The two signals may be 90 degrees apart in phase. Some example types of quadrature couplers include branchline couplers (also known as quadrature hybrid couplers), Lange couplers, and overlay couplers. As such, hardware circuit 426 can supply a digital output that enables system 420 to remove phase error when processing received radar signals transmitted via radar unit 422.

A technique used by system 420 to mitigate transmit phase noise may involve removing transmit phase noise based on the radio frequency (RF) associated with the radio channel used to transmit radar signals. Particularly, the technique may involve a hardware circuit designed to estimate transmit phase noise error based on the RF signal used to transmit radar signals.

System 420 may use a model to implement phase noise removal when transmitting and receiving radar signals. The model can represent the received phase history after the mixer as follows:

$$s_{out}(t) = \pi\gamma\frac{2r}{c} - 2\pi\gamma t\frac{2r}{c} - 2\pi f_0 \frac{2r}{c} + \rho\left(t - \frac{2r}{c}\right) - \rho(t) \quad [1]$$

where ρ represents the phase noise, r represents the range to the scatterer (e.g., an object in the environment), $f_0$ represents the carrier frequency, and γ represents the ramp rate. The phase noise (φ can arise from rapid, short term, random phase fluctuations that occur in a signal, such as a received radar reflection. The range (r) indicates a measured distance to the object or surface that reflected the radar signal back to the radar unit. The carrier frequency ($f_0$) can represent the frequency of the RF signal that is modulated to enable the system to capture the required data. The RF may be pulse modulated where the carrier is switched on and off in sync with the pulses. The envelope of the pulse waveform can be extracted from the demodulated carrier in the receiver.

The sampled signal may be real valued as follows:

$$x_{out} = A\cos(s_{out}) = \frac{A}{2}(\exp(js_{out}) + \exp(-js_{out})) \quad [2]$$

In equation [2], A represents a real-valued scale factor, which can differ in value within example models implemented by the system. In some instances, the radar system may be designed to confine the bandwidth of the sampled signal to half of its Nyquist frequency. In signal processing, the Nyquist frequency represents a characteristic of a sample, which converts a continuous function or signal into a discrete sequence. In units of cycles per second (Hz), the Nyquist frequency value is one-half of the sampling rate (samples per second). When the highest frequency (bandwidth) of a signal is less than the Nyquist frequency of the sampler, the resulting discrete-time sequence may be free of distortion (aliasing), and the corresponding sample-rate is above the Nyquist rate for the particular signal.

The radar system may have an IQ sampler, which can measure $x_{out}$. Particularly, quadrature signals, also referred to herein as IQ signals, IQ data or IQ samples, are often used in RF applications and form the basis of complex RF signal modulation and demodulation, both in hardware and in software, as well as in complex signal analysis. A pair of periodic signals are in "quadrature" when the signals differ in phase by 90 degrees with the "in-phase" or reference signal referred to as "I" and the signal that is shifted by 90 degrees (the signal in quadrature) referred to as "Q". The "I" can represent the amplitude of the in-phase signal and the "Q" can represent the amplitude of the quadrature signal. Thus, the amplitude and the phase of the sum of the quadrature signals can be described as a function of the value of "I" and "Q" and modulated RF signals can be produced by varying the "I" and "Q" values vs. time. For digital RF modulation, if "Q" is set to zero and "I" is altered between +1 and −1 over time, the system can leverage binary phase-shift keying (BPSK).

In some embodiments, the radar system may have a real-valued sampling system that can enable $\exp(-js_{out})$ in equation [2] to be ignored due to a design that can constrain $s_{out}$ to the lower half of the passband with half-band filtering the result. As a result, depending on the arrangement of the radar system, $x_{out}$ may be modeled using the following approximation:

$$x_{out} \approx A \exp(js_{out}) \quad [3]$$

The filter used by the radar system may be derived based on a range deskew filter as further described below. In some examples, the system may use a generic range deskew filter. An initial step of the derivation for the filter can involve removing the phase error (ρ) from the phase history presented above as follows:

$$x_2(t) = A\exp(js_2(t)) = x_{out}(t)\exp(j\rho(t)) \quad [4]$$

$$s_2(t) = s_{out}(t) + \rho(t) = \pi\gamma\frac{2r}{c} - 2\pi\gamma t\frac{2r}{c} - 2\pi f_0\frac{2r}{c} + \rho\left(t - \frac{2r}{c}\right) \quad [5]$$

In the frequency domain, equations [4] and [5] can be expressed as follows:

$$X_2(f) = \quad [6]$$
$$F\left\{A\exp\left(j\left(\pi\gamma\frac{2r}{c} - 2\pi\gamma t\frac{2r}{c} - 2\pi f_0\frac{2r}{c}\right)\right)\right\}(f) * F\left\{\exp\left(j\rho\left(t - \frac{2r}{c}\right)\right)\right\}(f)$$

As shown in equation [6], transform pairs are denoted with lower and upper case (i.e., $X(f)=F\{x(t)\}(f)$), wherein $F\{x\}(f)$ is the Fourier transform of function (x) and has an output that is a function of $(f)$. As such, equation [6] can be restated as follows:

$$X_2(f) = \left[A\exp\left(j\left(\pi\gamma\frac{2r}{c} - 2\pi f_0\frac{2r}{c}\right)\right)\delta\left(f + \gamma\frac{2r}{c}\right)\right] * \quad [7]$$
$$\left[\exp\left(-j2\pi\frac{2r}{c}f\right)F\{\exp(j\rho(t))\}(f)\right]$$

Convolution of a delta function can be equivalent to shift as shown here:

$$X_2(f) = A\exp\left(j\left(\pi\gamma\frac{2r}{c} - 2\pi f_0\frac{2r}{c}\right)\right) \quad [8]$$
$$\exp\left(-j2\pi\frac{2r}{c}\left(f + \gamma\frac{2r}{c}\right)\right)F\{\exp(j\rho(t))\}\left(f + \gamma\frac{2r}{c}\right)$$

The terms of equation [8] can be arranged to emphasize the application of the range deskew, which produces the following:

$$X_2(f) = \quad [9]$$
$$A\exp\left(-j2\pi f_0\frac{2r}{c}\right)\exp\left(-j\frac{\pi}{\gamma}\left[2\gamma\frac{2r}{c}f + \gamma^2\left(\frac{2r}{c}\right)^2\right]\right)F\{\exp(j\rho(t))\}\left(f + \gamma\frac{2r}{c}\right)$$

By extension, the range deskew can be performed as follows:

$$X_3(f) = X_2(f)\exp\left(-j\frac{\pi f^2}{\gamma}\right) \quad [10]$$

The terms shown in equation [10] can be expanded to produce:

$$X_3(f) = A\exp\left(-j2\pi f_0\frac{2r}{c}\right)\exp\left(-j\frac{\pi}{\gamma}\left(f + \frac{2r}{c}\right)^2\right)F\{\exp(j\rho(t))\}\left(f + \gamma\frac{2r}{c}\right) \quad [11]$$

As such, equation [11] can be modified to include a frequency shift by using convolution with a delta function to produce equation [12]. In addition, in the time domain, equation [11] can be represented as equation [13].

$$X_3(f) = \quad [12]$$
$$\left[A\exp\left(-j2\pi f_0\frac{2r}{c}\right)\delta\left(f + \gamma\frac{2r}{c}\right)\right] * \left[\exp\left(-j\frac{\pi}{\gamma}f^2\right)F\{\exp(j\rho(t))\}(f)\right]$$

$$x_3(t) = \quad [13]$$
$$A\exp\left(-j2\pi f_0\frac{2r}{c} - j2\pi\gamma\frac{2r}{c}t\right)F^{-1}\left\{\exp\left(-j\frac{\pi}{\gamma}f^2\right)F\{\exp(j\rho(t))\}(f)\right\}$$

The range deskewed phase noise can thus be denoted using the following:

$$\alpha(t) = F^{-1}\left\{\exp\left(-j\frac{\pi}{\gamma}f^2\right)F\{\exp(j\rho(t))\}(f)\right\} \quad [14]$$

As such, the range deskewed phase noise represented above in equation [14] can be removed from equation [13], which results in a clean, phase noise free phase history that can be represented as follows:

$$x_4(t) = x_3(t)\alpha^*(t) = A\exp\left(-j2\pi f_0\frac{2r}{c} - j2\pi\gamma\frac{2r}{c}t\right) \quad [15]$$

As shown above, equation [15] represents a phase history that lacks transmit noise. The system can use techniques presented herein to reduce transmit noise that can occur during the measurement of an environment. In particular, a hardware circuit may be implemented to remove noise within received radar signals based on the RF signal used to transmit radar signals. System 420 may implement the model.

Figure 5:
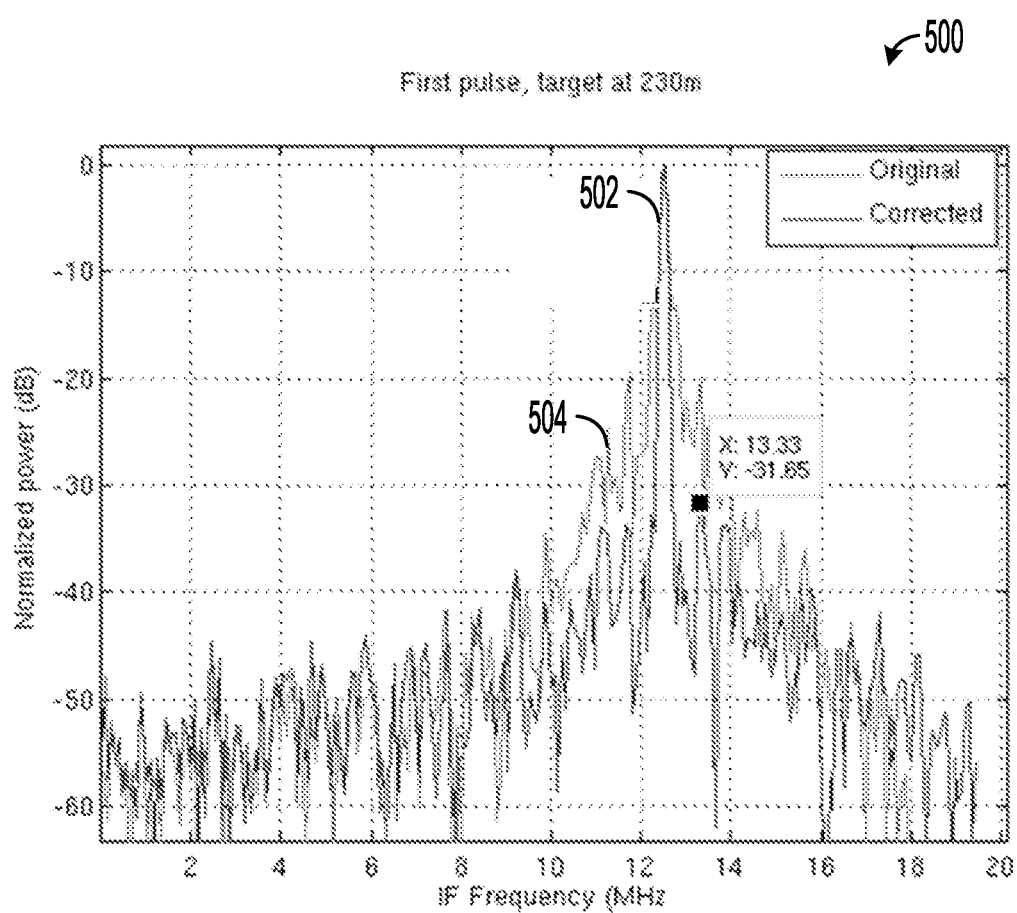
FIG. 5 illustrates a graph depicting a range spectrum formed by a single pulse, according to one or more embodiments.

FIG. 5 illustrates a graph depicting a range spectrum formed by a single pulse, according to one or more embodiments. In particular, the graph 500 illustrates the difference of the single pulse before noise removal (i.e., original data 504) and after noise removal (i.e., corrected data 502). The graph 500 may represent the difference between processing received radar signals without a hardware circuit designed to remove noise as represented by the original data 504 and processing radar signals with the hardware circuit designed to remove noise as represented by the corrected data 502.

In the embodiment shown in FIG. 5, the corrected data 502 is tapered using a Hann window. In other examples, one or more other windows (e.g., a rectangle window function) or filters may be used. As shown in the graph 500, the noise removal can remove a substantial amount of the noise from received signals and decrease peak sidelobe levels (e.g., about 20 dB lower) to improve processing efforts to measure aspects of the environment of the radar system.

Figure 6:
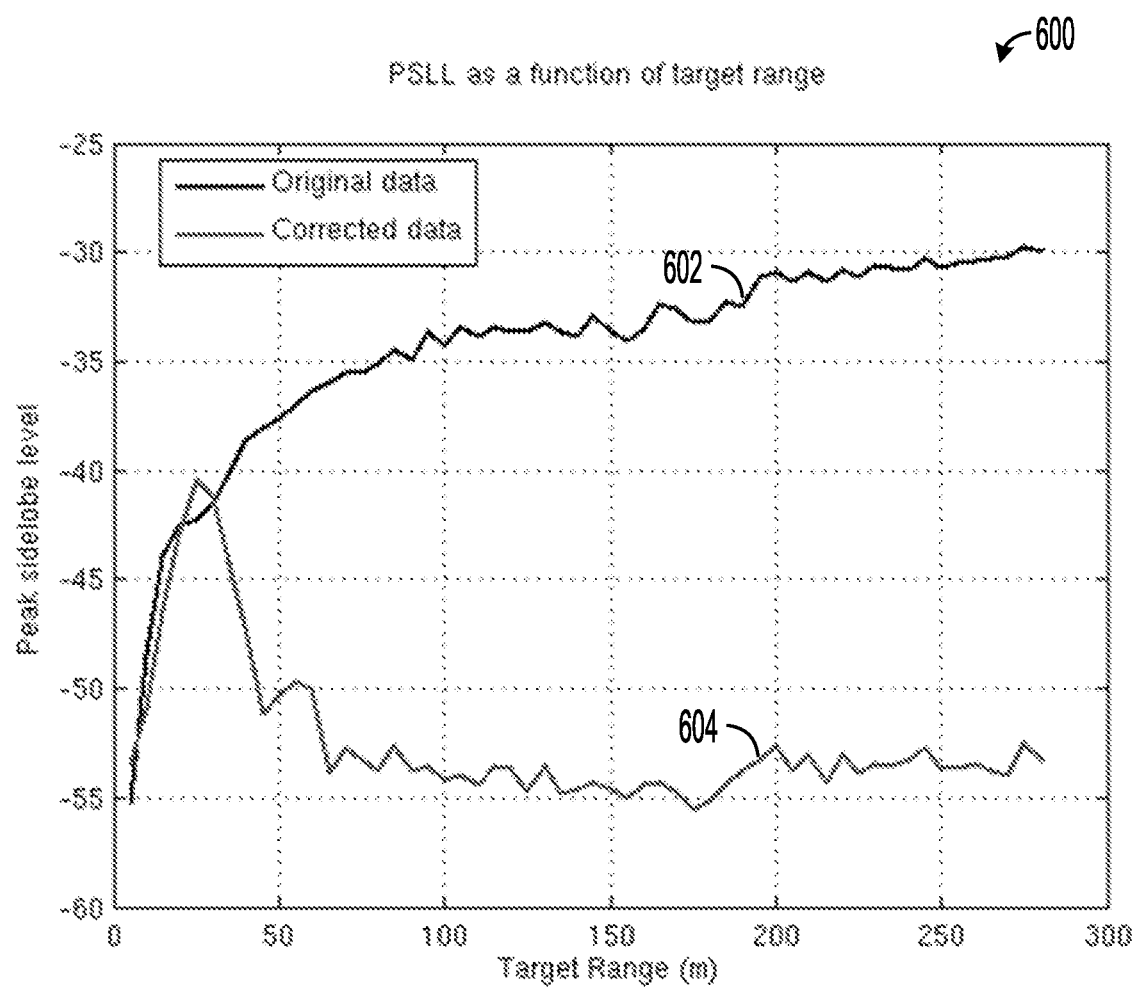
FIG. 6 illustrates another graph depicting peak sidelobe level as a function of target range, according to one or more embodiments.

FIG. 6 illustrates another graph depicting peak sidelobe level as a function of target range, according to one or more embodiments. As shown in the graph 600, the real value nature of a signal can create some interference between the phase noise and its image at the near range (e.g., between zero and 40 meters target range). The graph 600 also shows that the peak sidelobe level represented by the original data 602 and the modified peak sidelobe level represented by the corrected data 604 diverge with a target range around 40 meters as a result of the removal of transmit phase noise. In particular, the impact of reducing transmit phase error can be measured as shown in graph 600 from approximately 40 meters onward. The target range and peak sidelobe levels can differ when other radar units are used within examples.

A radar system may perform processing immediately after sampling. Particularly, the input may be real-valued receive signals and the output may be complex-valued signals at the same rate.

Figure 7:
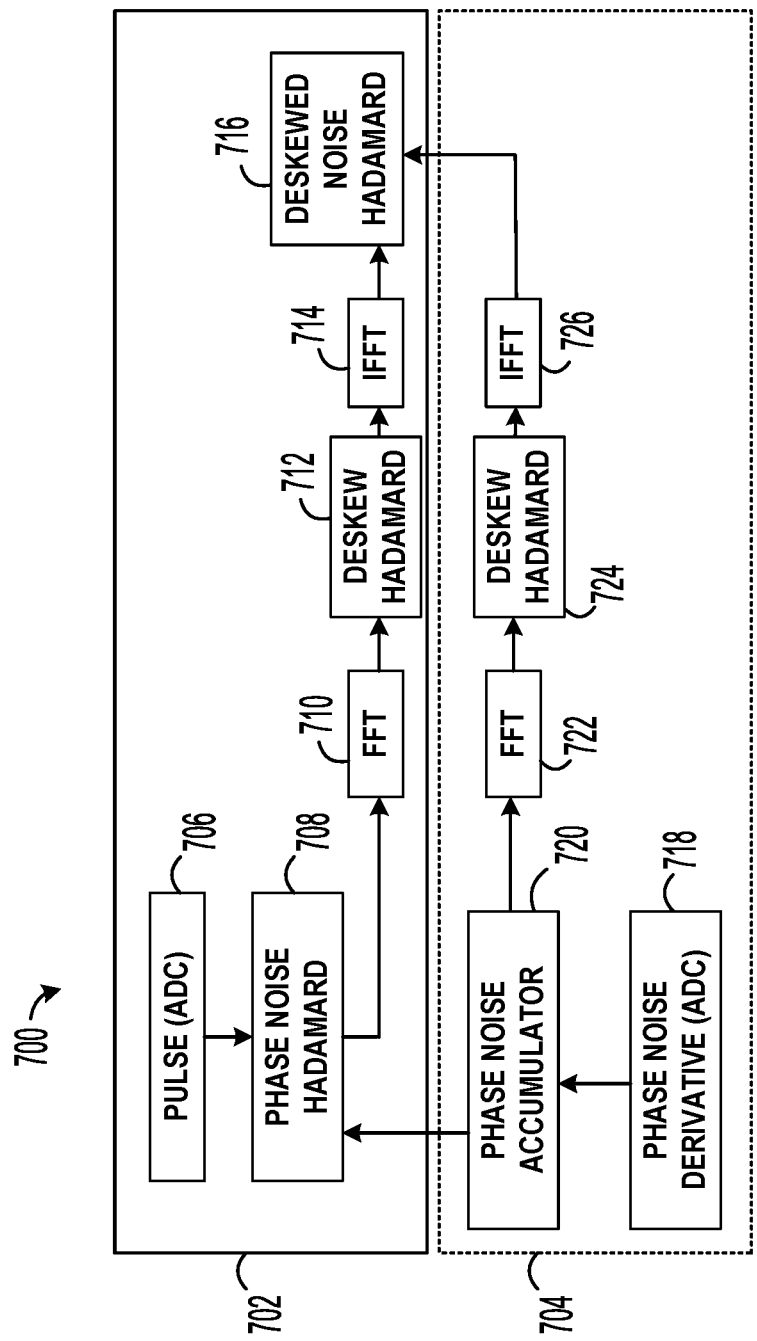
FIG. 7 illustrates a system for transmit phase noise removal, according to one or more example embodiments.

FIG. 7 illustrates a system for removing transmit phase noise according to one or more embodiments. System 700 may include radar processing components 702 and hardware circuit 704 with components designed to estimate transmit phase noise based on RF signals used for transmitting radar signals. In other examples, hardware circuit 704 may include more or fewer components in other arrangements.

Radar processing components 702 is shown with pulse (ADC) 706, phase noise hadamard 708, fast Fourier Transform (FFT) 710, deskew hadamard 712, inverse fast Fourier transform (IFFT) 714, and deskewed noise hadamard 716. Radar processing components 702 may receive radar reflections and process them to derive information regarding the environment, such as the positions, movements, and orientations of nearby objects. In the example embodiment shown in FIG. 7, radar processing components 702 corresponds to a stretch processing system.

Hardware circuit 704 represents an example phase noise estimation circuit and includes phase noise derivative (ADC) 718, phase noise accumulator 720, FFT 722, deskew hadamard 724, IFFT 726. As such, hardware circuit 704 may provide an output that can be combined via deskewed noise hadamard 716, which is shown as part of the signal processing. As shown, phase noise accumulator 720 provides a signal to phase noise hadamard 708. In some embodiments, phase noise derivative (ADC) 718 corresponds to equation [36] presented herein and phase noise accumulator 720 may correspond to equation [37] presented herein.

When a radar unit is operating, the transmit signal may be passed through a dispersive transmission line, such as a waveguide of length ($w_l$) with cutoff frequency ($f_c$). Since the radar signal has a LFM waveform (e.g., stretch LFM waveform), the time delay can be estimated to be $w_l/v_g(t)$ where $v_g(t)$ represents a frequency-dependent (and thus time dependent) delay and can be represented as follows:

$$v_g(t) = c\sqrt{1 - \left(\frac{f_c}{f_0 + \gamma t}\right)^2} \quad [16]$$

Although transition and turns can complicate group velocity, the analysis herein simplifies and models group velocity as a straight line. By modeling group velocity as a straight line, signal frequency at the waveguide terminus can be determined as follows:

$$f_{del}\left(t + \frac{w_l}{v(t)}\right) = f_{ref}(t) = f_0 + \gamma t + \frac{1}{2\pi}\dot{p}(t) \quad [17]$$

The analysis further involves a change of variable to $t$ where the following equation can be solved for $t$ as follows:

$$\hat{t} = t + \frac{w_l}{v_g(t)} \quad [18]$$

Since a closed form solution does not exist for equation [18], the following approximation may be used:

$$\hat{t} \approx t + \frac{w_l}{v_g(\hat{t})} \quad [19]$$

The approximation above arranges a delayed signal frequency as a function of time as follows:

$$f_{del}(t) \approx f_{ref}\left(t - \frac{w_l}{v(t)}\right) = f_0 + \gamma t - \frac{\gamma w_l}{v_g(t)} + \frac{1}{2\pi}\dot{p}\left(t - \frac{w_l}{v_g(t)}\right) \quad [20]$$

The last term above can be linearized as follows:

$$\dot{p}\left(t - \frac{w_l}{v_g(t)}\right) \approx \dot{p}(t) - \ddot{p}(t)\frac{w_l}{v_g(t)} \quad [21]$$

The antiderivative can be recited as follows:

$$p\left(t - \frac{w_l}{v_g(t)}\right) \approx p(t) - \dot{p}(t)\frac{w_l}{v_g(t)} + \int\left[\frac{d}{dt}\frac{w_l}{v_g(t)}\right]\dot{p}(t)dt \quad [22]$$

The last term is nearly constant and quite small. By setting the last term as zero, the following equation ma be produced:

$$p\left(t - \frac{w_l}{v_g(t)}\right) \approx p(t) - \dot{p}(t)\frac{w_l}{v_g(t)} \quad [23]$$

To solve for phase history, the following relationship may be used:

$$\frac{w_l}{v_g(t)} = \frac{d}{dt}\left[\frac{w_l(f_0 + \gamma t)}{\gamma v_p(t)}\right] \quad [24]$$

In equation [24], $v_p$ denotes phase velocity and can be defined as follows:

$$v_p(t) = c\left[1 - \left(\frac{f_c}{f_0 + \gamma t}\right)^2\right]^{-1/2} \quad [25]$$

The above equations can be used to solve for the phase history of the delayed signal (to within a constant) as follows:

$$s_{del}(t) \approx 2\pi f_0 t + \pi\gamma t^2 - 2\pi(f_0 + \gamma t)\frac{w_l}{v_p(t)} + p(t) - \dot{p}(t)\frac{w_l}{v_g(t)} \quad [26]$$

The delay line assembly may include an in-phase output and a quadrature output. Each of these outputs may have a slightly different length. For this analysis, the in-phase line may be analyzed as having length ($w_l$) and the quadrature line having length ($w_l+w_\tau$). The delay line outputs may be passed through an intermediate frequency (IF) filter, gain stages, a homodyne mixer, and ADC. At the output of these stages, the in-phase and quadrature signals r scaled by some constant A may be produced as follows:

$$r_i(t) = A\cos(\Delta(w_l)) \quad [27]$$

$$r_q(t) = A\cos(\Delta(w_l+w_\tau))) \quad [28]$$

In equations 27 and 28, the "Δ" is used to represent an implicit function of time and an explicit function of delay line length. These equations can be used to represent the digital "I" and "Q" signals sampled by the phase noise estimation circuit. As such, the "Δ" can be used to capture phase history after mixing in equation [29] as follows:

$$\Delta(d) = \left[2\pi f_0^d + \pi\gamma t^2 - 2\pi(f_0 + \gamma t)\frac{d}{v_p(t)} + \rho(t) - \dot{\rho}(t)\frac{d}{v_g(t)}\right] - \left[2\pi f_0^d + \pi\gamma t^2 + \rho(t)\right] \quad [29]$$

Equation [29] can condensed to produce equation [30] below:

$$\Delta(d) = -2\pi(f_0 + \gamma t)\frac{d}{v_p(t)} - \dot{\rho}\frac{d}{v_g(t)} \quad [30]$$

The length $w_l$ may be selected to provide a minimal group delay (e.g., 0.5 to 1 nanoseconds) and the length $w_\tau$ may be selected to approximately satisfy $\Delta(w_\tau) \approx -\pi/2$ across the operational bandwidth of the radar. Disregarding phase noise, the selection of the lengths can enable for some $f_0$ and $t_0$ to produce the following:

$$\pi/2 = 2\pi(f_0 + \gamma t_0)w_\tau/v_p(t_0) \quad [31]$$

Equation [31] can be rearranged to produce the following:

$$w_\tau = \frac{v_p(t_0)}{4(f_0 + \gamma t_0)} \quad [32]$$

In some instances, the IQ coupler may be narrowband and thus may result in an error. In particular, a system may aim to have a quadrature phase history $\Delta(w_l)-\pi/2$, but the narrow band may result in $\Delta(w_l+w_\tau)$. Since real signals are considered, an estimate of $\hat{A}$ may be developed as follows:

$$\hat{A} = \frac{1}{T}\int r_i(t)/\cos\left(-2\pi(f_0+\gamma t)\frac{w_l}{v_p(t)}\right)dt \quad [33]$$

By using the estimated $\hat{A}$, the following equations can be determined:

$$r_{q*}(t) = A\cos(\Delta(w_l + w_\tau))) + \epsilon \approx A\sin(\Delta(w_l)) \quad [34]$$

$$\epsilon = \hat{A}\cos\left(-2\pi(f_0+\gamma t)\frac{w_l+w_\tau}{v_p(t)}\right) - \hat{A}\cos\left(-2\pi(f_0+\gamma t)\frac{w_l}{v_p(t)} - \frac{\pi}{2}\right) \quad [35]$$

The correction above shown in equations [34] and [35] can work for a system, but represents an approximation that ignores phase noise. Accordingly, an approximation of the analytic signal can be determined as follows:

$$r_{iq}(t) = A\exp(\Delta(w_l)) \approx r_i(t) + jr_{q*}(t) \quad [36]$$

Equation [36] represents the reconstruction of the delayed complex phase history with the in-phase input represented as $r_i(t)$. In some embodiments, the quadrature output is modified using digital processing to produce $r_{iq}*(t)$. A phase error difference equation can be constructed using equation [36] as follows:

$$\dot{\rho}_{est}(t) \approx \frac{v_g(t)}{w_l} \angle\left\{r_{iq}^*(t)\exp\left(-2\pi(f_0+\gamma t)\frac{w_l}{v_p(t)}\right)\right\} \quad [37]$$

In equation [37], $\angle\{\cdot\}$ represents the phasor angle. Equation [37] can involve using the delayed analytic signal reconstructed from the delay line circuit input to calculate the time derivative of the phase error. In practice, phase error differences may be measured discreetly at times ($t_i$) at frequency ($f_s$), which enables phase error $\rho(t_i)$ to be estimated as a discrete integral using the following:

$$\rho(t_i) = \hat{c} + \sum_{j=0,\ldots i}\frac{\dot{\rho}_{est}(t_i)}{f_s} \quad [38]$$

In equation [38], $\hat{c}$ represents a real constant. Equation [37] can be integrated in equation [38] to obtain an estimate of the phase error $\rho(t_i)$. As such, system 420 or another systems described herein may use equation [38] to determine the phase error $\rho(t_i)$ that can be extracted from received signals to reduce sidelobes and increase clarity of the measurements.

Figure 8:
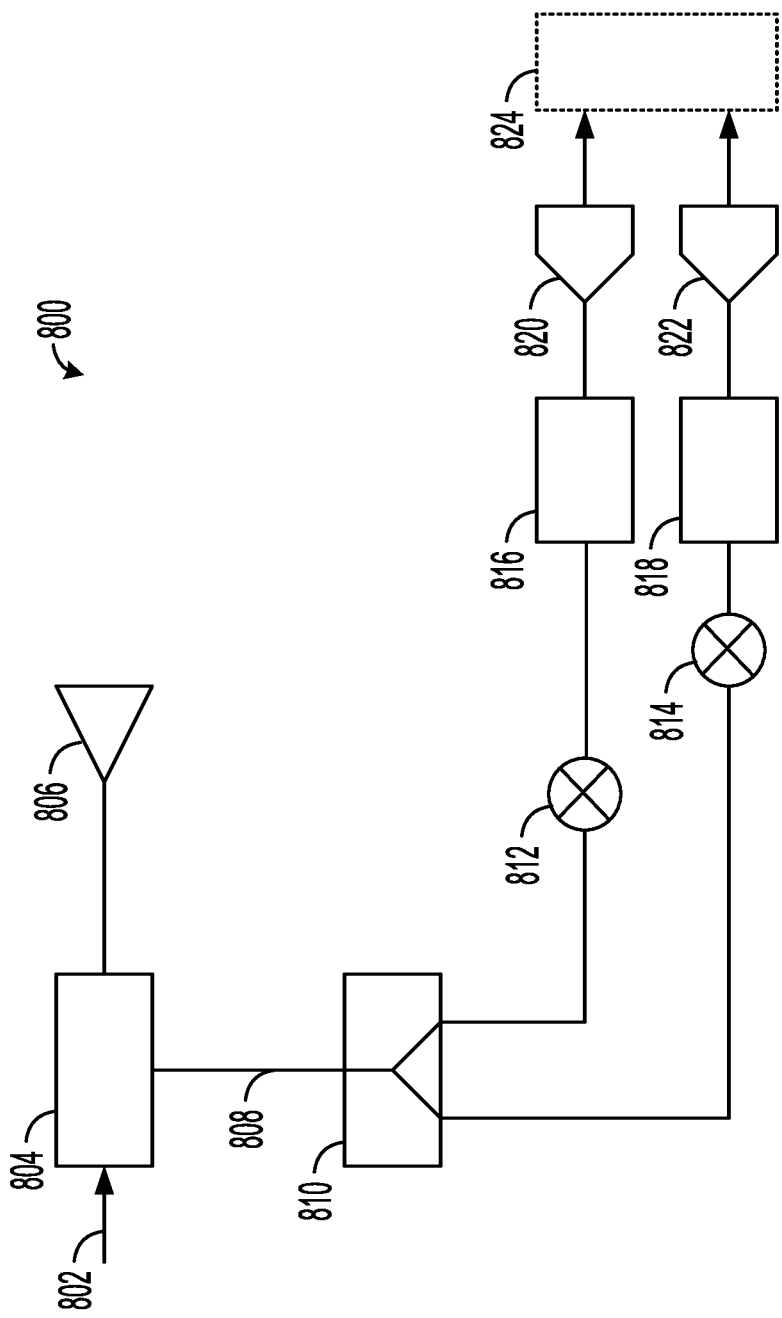
FIG. 8 illustrates another system for transmit phase noise removal, according to one or more example embodiments.

FIG. 8 illustrates a system for removing transmit phase noise, according to one or more example embodiments. System 800 may operate initially via an input of RF signal 802 for transmission by radar unit 804, which can include one or more transmission apertures 806 configured to transmit radar signals based on RF signal 802. In some embodiments, RF signal 802 originates from PCB and traverses through waveguides of radar unit 804 prior to transmission via transmission apertures 706 on a radio channel having an assigned center RF. As such, the transmission of the radar signals may involve using electromagnetic energy from one or more transmission lines. During operation, a computing device may modulate the frequency supplied to radar unit 804 for transmission.

System 800 further includes an associated hardware circuit that can be used to remove transmit phase noise that can arise during operation of radar unit 804. The hardware circuit may be implemented similar to examples presented herein and can include delay line 808 configured to obtain an indication of RF signal 802. For instance, delay line 808 may be coupled to one or more transmission lines associated with the radar unit 804, such as transmission lines on the PCB supplying RF signal 802. Delay line 808 may provide a portion of RF signal 802 or RF signal 802 into a coupler, such as quadrature coupler 810 shown in the example embodiment. Quadrature coupler 810 may divide RF signal 802 into two amplitude-modulated sinusoids that are offset in phase (e.g., by one-quarter cycle) with the same center frequency. The amplitude modulated sinusoids can be referred to as the in-phase and quadrature components. As such, the in-phase component of RF signal 802 may be fed into mixer 812 and quadrature component may be fed into mixer 814. Mixers 812, 814 may each output to intermediate frequency (IF) filters 816, 818, respectively. These IF filters can receive outputs from mixers 812, 814 and subsequently produce digital IQ signal 824. In the example embodiment shown in FIG. 8, IF filters 816, 818 are configured to provide signal outputs into analog-to-digital converters 820, 822, which may combine these outputs to form the digital IQ signal 824.

Digital IQ signal 824 can be output by the hardware circuit shown in FIG. 8 and used during signal processing to estimate transmit phase noise. The phase error that can arise during signal transmission can impact radar results and increase sidelobes that are captured within received signals. As such, a computing device processing radar returns can use digital IQ signal 824 and similar outputs from the hardware circuit shown in FIG. 8 to remove transmit phase noise and thereby enhance the measurements obtained from received signals associated with the transmitted signals transmitted by the radar unit 804 using RF signal 802. In other examples, the hardware circuit may include more or fewer components in other arrangements.

Figure 9:
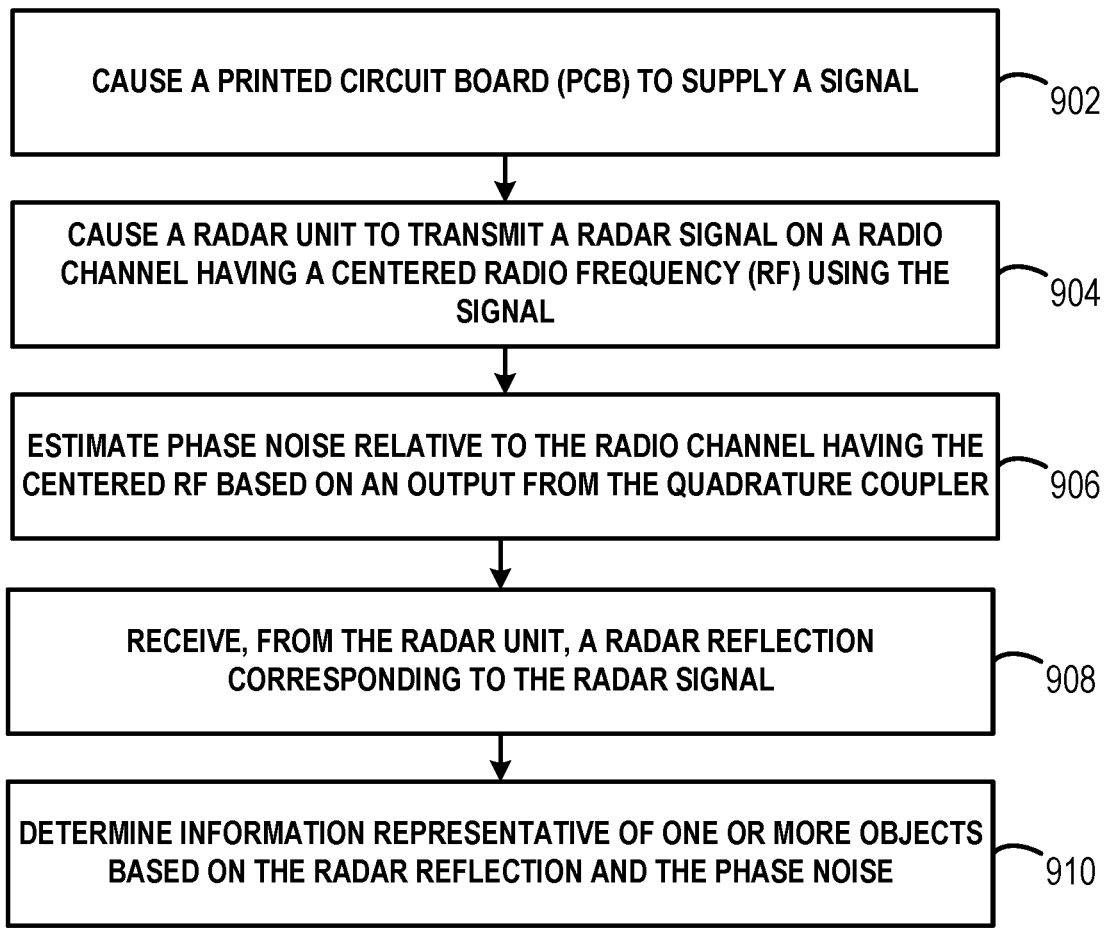
FIG. 9 is a flowchart of a method for removing noise from a received radar signal, according to one or more example embodiments.

FIG. 9 is a flowchart of a method for removing transmit phase noise during radar. Method 900 represents an example method that may include one or more operations, functions, or actions, as depicted by one or more of blocks 902, 904, 906, 908, and 910 each of which may be carried out by any of the systems shown in FIGS. 1-7, among other possible systems.

Those skilled in the art will understand that the flowchart described herein illustrate functionality and operation of certain implementations of the present disclosure. In this regard, each block of the flowchart may represent a module, segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrently or in reverse order, depending on the functionality involved, as would be understood by those reasonably skilled in the art. In examples, a computing system may cause a radar system to perform one or more blocks of method 900.

At block 902, method 900 involves causing a printed circuit board (PCB) to supply a signal. The printed circuit board can be associated with a radar unit, a radar system in general, and/or another computing device. In other examples, a different source may output the signal.

At block 904, method 900 involves causing a radar unit to transmit a radar signal on a radio channel having a center radio frequency (RF) using the signal. Transmission of the radar signal involves using electromagnetic energy from a transmission line coupled to the PCB. The radar unit may operate using signals from various types of transmission medium, such as micro-lines, cables, and/or waveguides. In some embodiments, the radar unit is configured to transmit the radar signal as a stretch LFM pulse waveform.

At block 906, method 900 involves estimating phase noise relative to the radio channel having the centered RF based on an output from the quadrature coupler. To estimate phase error, the RF signal (or an indication of the RF signal) can be input into a hardware circuit associated with the radar unit. For example, the hardware circuit may be a phase noise removal circuit that includes a delay line that can deliver the RF signal to a quadrature coupler, which can an output that can be factored to estimate phase noise. In particular, the output from the coupler can be further processed to estimate the phase error that can impact signal transmission. The quadrature coupler can be configured to generate a digital output as a complex-valued signal. For example, the hardware circuit may resemble system 700 or system 800 shown in FIGS. 7 and 8, respectively. In some embodiments, the delay line can be coupled to other components, such as IF filters, one or more gain stages, homodyne mixers, and/or ADCs. These components can help refine the phase error estimation and may be arranged as part of the phase noise removal circuit.

At block 906, method 900 involves receiving, by the radar unit, a radar reflection corresponding to the radar signal. The radar unit may receive signals that correspond to reflections of radar signals bouncing off one or more surfaces in the environment. As such, the radar unit may include one or more receiver apertures configured to receive these radar reflections.

In some embodiments, the computing device may generate a mixed signal that combines the radar reflection and the digital output from the quadrature coupler responsive to receiving the radar signal. As such, the computing device may further modify the mixed signal based on the phase noise, which may involve using a digital filter to modify the mixed signal. In particular, the digital filter can be configured to remove the phase noise from the mixed signal. In some embodiments, the digital filter may be a range deskew filter or may have one or more properties that operate similar to the range deskew filter.

At block 908, method 900 involves determining information representative of one or more objects based on the radar reflection and the phase noise. A computing device processing the received signal may determine target information that indicates positions, sizes, orientations, and movements of objects in the environment. The processing may involve factoring the phase error associated with the received signal based on the output by the hardware circuit.

In some examples, method 900 may involve controlling an autonomous vehicle based on the information representative of objects in the environment. Controlling the vehicle may involve performing a navigation strategy that factors the information obtained via radar. In other embodiments, the computing device may provide instructions to a control system of the vehicle based on the information representative of the one or more objects. The control system can be configured to control the vehicle based at least in part on the instructions.

Figure 10:
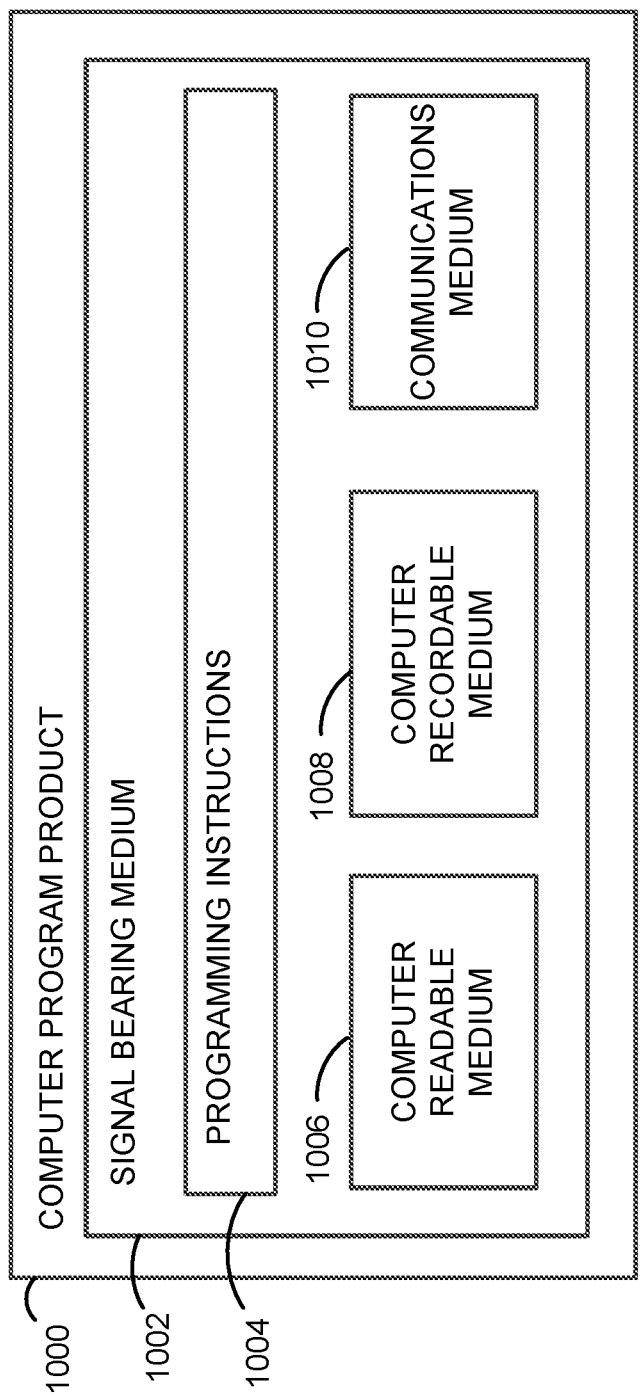
FIG. 10 illustrates a schematic diagram of a computer program, according to example embodiments.

FIG. 10 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

Example computer program product 1000 can be provided using signal bearing medium 1002, which may include one or more programming instructions 1004 that, when executed by one or more processors may provide functionality or portions of the functionality described above with respect to FIGS. 1-9. In some examples, the signal bearing medium 1002 may encompass a non-transitory computer-readable medium 1006, such as, but not limited to, a hard disk drive, a Compact Disc (CD), a Digital Video Disk (DVD), a digital tape, memory, etc. In some implementations, the signal bearing medium 1002 may encompass a computer recordable medium 1008, such as, but not limited to, memory, read/write (R/W) CDs, R/W DVDs, etc. In some implementations, the signal bearing medium 1002 may encompass a communications medium 1010, such as, but not limited to, a digital and/or an analog communication medium (e.g., a fiber optic cable, a waveguide, a wired communications link, a wireless communication link, etc.). Thus, for example, the signal bearing medium 1002 may be conveyed by a wireless form of the communications medium 1010.

One or more programming instructions 1004 may be, for example, computer executable and/or logic implemented instructions. In some examples, a computing device such as the computer system 112 of FIG. 1 or computing device 400 of FIG. 4 may be configured to provide various operations, functions, or actions in response to the programming instructions 1004 conveyed to the computer system 112 by one or more of the computer readable medium 1006, the computer recordable medium 1008, and/or the communications medium 1010.

The non-transitory computer readable medium could also be distributed among multiple data storage elements, which could be remotely located from each other. The computing device that executes some or all of the stored instructions could be a vehicle, such as vehicle 100 illustrated in FIGS. 2A-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A system comprising:
a radar unit;
a printed circuit board (PCB) having a transmission line coupled to the radar unit and a delay line coupled to a quadrature coupler; and
a processing unit configured to:
cause the PCB to supply a signal, wherein the transmission line is configured to couple the signal to the radar unit and the delay line is configured to couple the signal to the quadrature coupler;
cause the radar unit to transmit a radar signal on a radio channel having a centered radio frequency (RF) using the signal;
estimate phase noise relative to the radio channel having the centered RF based on both an output from the quadrature coupler and a dispersive nature of the delay line, wherein the quadrature coupler receives the signal via the delay line and generates the output as a complex-valued signal, wherein the dispersive nature of the delay line depends on a length of the delay line, wherein the delay line comprises an in-phase output line and a quadrature output line, and wherein a length of the quadrature output line is greater than a length of the in-phase output line;
receive, from the radar unit, a radar reflection corresponding to the radar signal;
responsive to receiving the radar reflection, generate a mixed signal that combines the radar reflection and the output from the quadrature coupler;
remove, using a range deskew filter, phase noise from the mixed signal, wherein the phase noise removed from the mixed signal is based on the phase noise estimated relative to the radio channel having the centered RF; and
determine information representative of one or more objects using the mixed signal.

2. The system of claim 1, wherein the radar unit is configured to transmit the radar signal as a stretch Linear Frequency Modulated (LFM) pulse waveform.

3. The system of claim 1, wherein the delay line and the quadrature coupler correspond to a phase noise measurement circuit, and wherein the phase noise measurement circuit further includes an intermediate frequency (IF) filter, one or more gain stages, a homodyne mixer, and an analog-to-digital converter.

4. The system of claim 1, wherein the radar unit is coupled to a vehicle, and wherein the processing unit is further configured to:
provide instructions to a control system of the vehicle based on the information representative of the one or more objects, wherein the control system is configured to control the vehicle based at least in part on the instructions.

5. A method comprising:
causing, by a computing device, a printed circuit board (PCB) to supply a signal, wherein the PCB includes a transmission line coupled to a radar unit and a delay line coupled to a quadrature coupler, and wherein the transmission line is configured to couple the signal to the radar unit and the delay line is configured to couple the signal to the quadrature coupler;
causing, by the computing device, the radar unit to transmit a radar signal on a radio channel having a centered radio frequency (RF) using the signal;
estimating phase noise relative to the radio channel having the centered RF based on both an output from the quadrature coupler and a dispersive nature of the delay line, wherein the quadrature coupler receives the signal via the delay line and generates the output as a complex-valued signal, wherein the dispersive nature of the delay line depends on a length of the delay line, wherein the delay line comprises an in-phase output line and a quadrature output line, and wherein a length of the quadrature output line is greater than a length of the in-phase output line;
receiving, at the computing device and from the radar unit, a radar reflection corresponding to the radar signal;
responsive to receiving the radar reflection, generating a mixed signal that combines the radar reflection and the output from the quadrature coupler;
removing, using a range deskew filter, phase noise from the mixed signal, wherein the phase noise removed from the mixed signal is based on the phase noise estimated relative to the radio channel having the centered RF; and
determining, by the computing device, information representative of one or more objects using the mixed signal.

6. The method of claim 5, wherein causing the radar unit to transmit the radar signal on the radio channel having the centered radio frequency (RF) using the signal comprises:

causing the radar unit to transmit the radar signal as a stretch Linear Frequency Modulated (LFM) pulse waveform.

7. The method of claim 5, further comprising:

providing instructions to a control system of a vehicle based on the information representative of the one or more objects, wherein the control system is configured to control the vehicle based at least in part on the instructions.

8. A non-transitory computer-readable medium configured to store instructions, that when executed by a computing system comprising one or more processors, causes the computing system to perform operations comprising:

causing a printed circuit board (PCB) to supply a signal, wherein the PCB includes a transmission line coupled to a radar unit and a delay line coupled to a quadrature coupler, and wherein the transmission line is configured to couple the signal to the radar unit and the delay line is configured to couple the signal to the quadrature coupler;

causing the radar unit to transmit a radar signal on a radio channel having a centered radio frequency (RF) using the signal;

estimating phase noise relative to the radio channel having the centered RF based on both an output from the quadrature coupler and a dispersive nature of the delay line, wherein the quadrature coupler receives the signal via the delay line and generates the output as a complex-valued signal, wherein the dispersive nature of the delay line depends on the length of the delay line, wherein the delay line comprises an in-phase output line and a quadrature output line, and wherein a length of the quadrature output line is greater than a length of the in-phase output line;

receiving, from the radar unit, a radar reflection corresponding to the radar signal;

responsive to receiving the radar reflection, generating a mixed signal that combines the radar reflection and the output from the quadrature coupler;

removing, using a range deskew filter, phase noise from the mixed signal, wherein the phase noise removed from the mixed signal is based on the phase noise estimated relative to the radio channel having the centered RF; and determining information representative of one or more objects using the mixed signal.

9. The non-transitory computer-readable medium of claim 8, wherein causing the radar unit to transmit the radar signal on the radio channel having the centered radio frequency (RF) using the signal comprises:

causing the radar unit to transmit the radar signal as a stretch Linear Frequency Modulated (LFM) pulse waveform.

10. The non-transitory computer-readable medium of claim 8, further comprising:

providing instructions to a control system of a vehicle based on the information representative of the one or more objects, wherein the control system is configured to control the vehicle based at least in part on the instructions.

11. The system of claim 1, wherein the quadrature coupler is further configured to generate a first output and a second output, wherein the first output and the second output have a 90 degree phase difference.

12. The system of claim 11, wherein the processing unit is further configured to:

independently mix the first output and the second output down to basebands prior to an analog-to-digital sampling.

* * * * *